(12) United States Patent
Yang et al.

(10) Patent No.: US 9,706,220 B2
(45) Date of Patent: Jul. 11, 2017

(54) VIDEO ENCODING METHOD AND DECODING METHOD AND APPARATUSES

(71) Applicant: Huawei Technologies Co., Ltd., Shenzhen (CN)

(72) Inventors: Haitao Yang, Shenzhen (CN); Jinwen Zan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/869,141

(22) Filed: Sep. 29, 2015

(65) Prior Publication Data

US 2016/0021388 A1 Jan. 21, 2016

Related U.S. Application Data

(63) Continuation of application No. PCT/CN2014/075092, filed on Apr. 10, 2014.

(30) Foreign Application Priority Data

Apr. 10, 2013 (CN) .......................... 2013 1 0123600

(51) Int. Cl.
*H04N 19/00* (2014.01)
*H04N 19/52* (2014.01)
(Continued)

(52) U.S. Cl.
CPC ........... *H04N 19/52* (2014.11); *H04N 19/105* (2014.11); *H04N 19/109* (2014.11);
(Continued)

(58) Field of Classification Search
None
See application file for complete search history.

(56) References Cited

U.S. PATENT DOCUMENTS 5,825,423 A 10/1998 Jung
6,229,854 B1 5/2001 Kikuchi et al.
(Continued)

FOREIGN PATENT DOCUMENTS

CN 1671209 A 9/2005
CN 101218829 A 7/2008
(Continued)

OTHER PUBLICATIONS

Video coding Technology Proposal.Dresden. 2010.*
(Continued)

*Primary Examiner* — Delomia L Gilliard
(74) *Attorney, Agent, or Firm* — Conley Rose, P.C.

(57) ABSTRACT

A video decoding method includes acquiring N pieces of motion information of a target area according to motion-related information in a bitstream, where N is an integer greater than or equal to 2, separately performing a motion compensation operation on the target area by using each piece of motion information in the N pieces of motion information to obtain N predictions of the target area, where each prediction in the N predictions of the target area includes predicted values of all sampling points in the target area, acquiring a prediction selection reference of the target area, where the prediction selection reference of the target area is values of all sampling points in a corresponding reference area of the target area, and determining a final prediction of the target area according to the N predictions of the target area and the prediction selection reference of the target area.

17 Claims, 15 Drawing Sheets

(51) Int. Cl.
H04N 19/176 (2014.01)
H04N 19/105 (2014.01)
H04N 19/136 (2014.01)
H04N 19/57 (2014.01)
H04N 19/573 (2014.01)
H04N 19/109 (2014.01)
H04N 19/537 (2014.01)

(52) U.S. Cl.
CPC ......... *H04N 19/136* (2014.11); *H04N 19/176* (2014.11); *H04N 19/537* (2014.11); *H04N 19/57* (2014.11); *H04N 19/573* (2014.11)

(56) References Cited

U.S. PATENT DOCUMENTS

| | | | |
|---|---|---|---|
| 8,311,089 | B2 | 11/2012 | Ishikawa et al. |
| 2005/0207496 | A1 | 9/2005 | Komiya et al. |
| 2007/0064804 | A1 | 3/2007 | Paniconi et al. |
| 2007/0291850 | A1 | 12/2007 | Ishikawa et al. |
| 2011/0164684 | A1 | 7/2011 | Sato et al. |
| 2011/0249751 | A1 | 10/2011 | Laroche et al. |
| 2016/0295233 | A1 | 10/2016 | Lin et al. |

FOREIGN PATENT DOCUMENTS

| | | | | |
|---|---|---|---|---|
| CN | 101268701 | A | 9/2008 | |
| CN | 101686393 | A | 3/2010 | |
| CN | 101873500 | A | 10/2010 | |
| CN | EP 2334080 | A1 * | 6/2011 | ............. H04N 19/56 |
| CN | 102160384 | A | 8/2011 | |
| EP | 1351510 | A1 | 10/2003 | |
| EP | 1919223 | A1 | 5/2008 | |
| EP | 2234080 | A1 | 6/2011 | |
| JP | EP 1919223 | A1 * | 5/2008 | ............. H04N 19/61 |
| JP | EP 2023639 | A1 * | 2/2009 | ........... H04N 19/105 |

OTHER PUBLICATIONS

Improving AVC Compression Performance by Template Matching with Decoder-side Motion Vector Derivation. Archamps. 2008.*

Partial English Translation and Abstract of Chinese Patent Application No. CN101873500, Dec. 16, 2015, 8 pages.

"Line Transmission of Non-Telephone Signals, Video Codec for Audiovisual Services at p x 64 kbits," ITU-T, H261, Mar. 1993, 29 pages.

"Series H: Audiovisual and Multimedia Systems Infrastructure of audiovisual—Coding of moving video, Video coding for low bit rate communication," ITU-T, H.263, Jan. 2005, 226 pages.

"Series H: Audiovisual and Multimedia Systems, Infrastructure of Audiovisual services—Coding of moving video, Advanced video coding for generic audiovisual services," ITU-T, H.264, Mar. 2010, 676 pages.

Foreign Communication From a Counterpart Application, PCT Application No. PCT/CN2014/075092, English Translation of International Search Report dated Jul. 11, 2014, 2 pages.

Foreign Communication From a Counterpart Application, PCT Application No. PCT/CN2014/075092, English Translation of Written Opinion dated Jul. 11, 2014, 9 pages.

Takahiro, F., et al., "Very Low Bit-Rate Video Coding with Block Partitioning and Adaptive Selection of Two Time-Differential Frame Memories," IEEE Transactions on Circuits and Systems for Video Technology, vol. 7, No. 1, Feb. 1997, pp. 212-220.

Yang, H., et al., "Description of video coding technology proposal by Huawei Technologies & Hisilicon Technologies," Joint Collaborative Team on Video Coding (JCT-VC) of ITU-T SG16 WP3 and ISO/IEC JTC1/SC29/WG11, JCTVC-A111, Apr. 15-23, 2010, 26 pages.

McCann, K., et al., "Samsung's Response to the Call for Proposals on Video Compression Technology," Joint Collaborative Team on Video Coding (JCT-VC) of ITU-T SG16 WP3 and ISO/IEC JTC1/SC29/WG11, JCTVC-A124, Apr. 2010, 42 pages.

Steffen, K., et al., "Improving AVC compression performance by template matching with decoder-side motion vector derivation," ISO/IEC JTC1/SC29/WG11, MPEG2008/M15375, Apr. 2008, 12 pages.

Zan, J., "Motion-based adaptive partition technique with an application on SHVC," Joint Collaborative Team on Video Coding (JCT-VC) of ITU-T SG 16 WP 3 and ISO/IEC JCT1/SC 29/WG 11, JCTVC-M0070, Apr. 18-26, 2013, 6 pages.

Foreign Communication From a Counterpart Application, European Application No. 14783170.5, Extended European Search Report dated Feb. 3, 2016, 13 pages.

Partial English Translation and Abstract of Chinese Patent Application No. CN101218829, Feb. 8, 2017, 62 pages.

Foreign Communication From a Counterpart Application, Chinese Application No. 201310123600.2, Chinese Office Action dated Dec. 27, 2016, 11 pages.

* cited by examiner

VIDEO ENCODING METHOD AND DECODING METHOD AND APPARATUSES

CROSS-REFERENCE TO RELATED APPLICATIONS

This application is a continuation of International Application No. PCT/CN2014/075092, filed on Apr. 10, 2014, which claims priority to Chinese Patent Application No. 201310123600.2, filed on Apr. 10, 2013, both of which are hereby incorporated by reference in their entireties.

TECHNICAL FIELD

The present disclosure relates to the field of signal processing, and in particular, to a video encoding method and decoding method and apparatuses.

BACKGROUND

With rapid development of the Internet and increasingly rich material and spiritual culture of people, in the Internet, there are more requirements for applications for videos, especially for high-definition videos. However, a high-definition video has a very large amount of data; if the high-definition video is to be transmitted in the Internet with finite bandwidth, an issue needing to be solved first is an issue of encoding the high-definition video.

In all mainstream video encoding solutions, redundant information between pictures in a video sequence is removed by using a picture block-based motion compensated prediction technology. A picture may be considered as a two-dimensional sampling point array, and a picture block may also be considered as a two-dimensional sampling point array, where the picture block is an area of the picture, a sampling point generally may also be considered as a pixel, and a pixel is a unit for calculation of a digital image. For example, a picture may be recorded as $Pic(x,y)$, where $x=0 \ldots W-1$, $y=0 \ldots H-1$, $Pic(x,y)$ represents a value of a sampling point at a coordinate position $(x,y)$ in a coordinate system built in a width direction and a height direction of a two-dimensional sampling point array of the picture, and W and H respectively represent a width and a height of the two-dimensional sampling point array. For another example, a picture block may be recorded as $Blk(x,y)$, where $x=0 \ldots w-1$, $y=0 \ldots h-1$, $Blk(x,y)$ represents a value of a sampling point at a coordinate position $(x,y)$ in a coordinate system built in a width direction and a height direction of a two-dimensional sampling point array of the picture block, and w and h respectively represent a width and a height of the two-dimensional sampling point array. For example, if a luminance signal of the picture is sampled, a value of a sampling point is a luminance value.

When a picture block $Blk(x,y)$ of a picture in a video sequence is encoded, that is, the picture block $Blk(x,y)$ is used as a target area, a matching block $Blk'(x,y)$ may be searched for in a reference picture and used as a reference area, and a prediction $Pred(x,y)$ of the target area may be generated based on the matching block, so that only a prediction error determined based on the prediction needs to be encoded and transmitted to a decoder end. A position of the matching block in the reference picture is described by a motion vector. The reference picture refers to a neighboring picture that has been reconstructed when a target picture is encoded or decoded; in this case, the reference area may be a picture block in the reference picture, and matches the target area in terms of a content feature. Information indicating a source of the matching block is referred to as motion information, and may include the motion vector and other supplementary information. The motion information needs to be transmitted to the decoder end, so that the decoder end may perform a motion compensation operation the same as that performed by an encoder end to obtain the prediction of the picture block. In combination with the prediction obtained through motion compensation and the prediction error obtained through decoding, the decoder end can obtain a reconstruction of the picture block, thereby completing a decoding operation on the picture block.

A picture block having independent motion information is referred to as a motion partition. The motion partition may be a square block or a rectangular block that is not square. The motion partition is a basic unit of motion compensated prediction. For ease of implementation, in all the mainstream video encoding solutions, a rectangular motion partition is used.

In video encoding and decoding methods, an encoder end finds, in a reference picture by using a strong time correlation between the reference picture and a target picture, a reference area matching a picture block, that is, a target area, in the target picture in terms of a content feature, and determines motion partitions of the target area according to a content feature of the reference area. For example, it is displayed in the reference area that two cups are separately placed on the left and right of a desk; when picture partition is performed based on a picture content feature, the reference area may be partitioned into 3 picture blocks in total: the desk, the cup on the left, and the cup on the right, and the 3 picture blocks are used as 3 motion partitions of the target area. After the motion partitions of the target area are determined, the encoder end performs search for each motion partition of the target area to obtain motion information of each motion partition, encodes the motion information, and transmits the motion information to a decoder end. Moreover, the encoder end performs search to determine a motion vector of the reference area, and transmits the motion vector to the decoder end, so that the decoder end and the encoder end may determine the same reference area, and further use a same reference area content feature analyzing method to determine the motion partitions of the target area; after a quantity of motion partitions is determined, the decoder end performs a motion compensation operation on the target area according to the corresponding motion information to obtain predictions whose quantity is the same as that of the motion partitions, combines the predictions to obtain a final prediction of the target area, and reconstructs the target area according to the final prediction.

However, in this method, the encoder end of a video performs picture partition based on the picture content feature without considering a motion characteristic, the motion information of the motion partitions obtained through the partition has low accuracy in describing the target area, and correspondingly, the motion information obtained by the decoder end has low accuracy; therefore, video decoding performance is affected, and decoding precision is low.

SUMMARY

Embodiments of the present disclosure provide a video encoding method and decoding method and apparatuses, which can enhance video decoding performance, and improve decoding precision.

In order to achieve the foregoing objectives, the following technical solutions are used in the embodiments of the present disclosure According to a first aspect, a video decoding method is provided, which is applied to a decoder end and includes acquiring N pieces of motion information of a target area according to motion-related information in a bitstream generated by an encoder end, where N is an integer greater than or equal to 2, separately performing a motion compensation operation on the target area by using each piece of motion information in the N pieces of motion information to obtain N predictions of the target area, where each prediction in the N predictions of the target area includes predicted values of all sampling points in the target area, acquiring a prediction selection reference of the target area, where the prediction selection reference of the target area is values of all sampling points in a corresponding reference area of the target area, and determining a final prediction of the target area according to the N predictions of the target area and the prediction selection reference of the target area.

With reference to the first aspect, in a first possible implementation manner, the target area consists of M basic prediction units, where M is greater than or equal to 2, and the determining a final prediction of the target area according to the N predictions of the target area and the prediction selection reference of the target area includes determining a final prediction of the basic prediction unit according to N predictions of the basic prediction unit and a prediction selection reference of the basic prediction unit, where each prediction in the N predictions of the basic prediction unit consists of predicted values of all sampling points in the basic prediction unit, and the prediction selection reference of the basic prediction unit is values of all sampling points of a reference area corresponding to the basic prediction unit.

With reference to the first possible implementation manner, in a second possible implementation manner, the determining a final prediction of the basic prediction unit according to N predictions of the basic prediction unit and a prediction selection reference of the basic prediction unit includes calculating N prediction errors of the basic prediction unit according to the N predictions of the basic prediction unit and the prediction selection reference of the basic prediction unit, and comparing the N prediction errors of the basic prediction unit, and acquiring a prediction, corresponding to a minimum prediction error, of the basic prediction unit as the final prediction of the basic prediction unit.

With reference to the first possible implementation manner, in a third possible implementation manner, the determining a final prediction of the basic prediction unit according to N predictions of the basic prediction unit and a prediction selection reference of the basic prediction unit includes determining N weighting factors of the basic prediction unit according to the N predictions of the basic prediction unit and the prediction selection reference of the basic prediction unit, and performing weighted averaging on the N predictions of the basic prediction unit by using the N weighting factors to obtain the final prediction of the basic prediction unit.

With reference to the third possible implementation manner, in a fourth possible implementation manner, the determining N weighting factors of the basic prediction unit according to the N predictions of the basic prediction unit and the prediction selection reference of the basic prediction unit includes calculating N prediction errors of the basic prediction unit according to the N predictions of the basic prediction unit and the prediction selection reference of the basic prediction unit, and separately obtaining reciprocals of the N prediction errors of the basic prediction unit to obtain the N weighting factors of the basic prediction unit.

With reference to the second or fourth possible implementation manner, in a fifth possible implementation manner, the basic prediction unit consists of one or more sampling points.

With reference to the second or fourth possible implementation manner, in a sixth possible implementation manner, when the basic prediction unit consists of one sampling point, the calculating N prediction errors of the basic prediction unit according to the N predictions of the basic prediction unit and the prediction selection reference of the basic prediction unit includes separately obtaining absolute differences between values of the sampling point in the N predictions of the basic prediction unit and a value of the sampling point in the prediction selection reference of the basic prediction unit to obtain the N prediction errors of the basic prediction unit, or separately obtaining squares of differences between values of the sampling point in the N predictions of the basic prediction unit and a value of the sampling point in the prediction selection reference of the basic prediction unit to obtain the N prediction errors of the basic prediction unit.

With reference to the second or fourth possible implementation manner, in a seventh possible implementation manner, when the basic prediction unit consists of one sampling point, the calculating N prediction errors of the basic prediction unit according to the N predictions of the basic prediction unit and the prediction selection reference of the basic prediction unit includes separately obtaining differences between values of the sampling point in the N predictions of the basic prediction unit and a value of the sampling point in the prediction selection reference of the basic prediction unit, performing filtering processing on each of the differences, and obtaining absolute values, to obtain the N prediction errors of the basic prediction unit, or separately performing filtering processing on values of the sampling point in the N predictions of the basic prediction unit, performing filtering processing on a value of the sampling point in the prediction selection reference of the basic prediction unit, and separately obtaining absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

With reference to the second or fourth possible implementation manner, in an eighth possible implementation manner, when the basic prediction unit consists of multiple sampling points, the calculating N prediction errors of the basic prediction unit according to the N predictions of the basic prediction unit and the prediction selection reference of the basic prediction unit includes separately obtaining absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit, and separately acquiring the sum of all absolute differences in each absolute-difference set in the N absolute-difference sets to obtain the N prediction errors of the basic prediction unit, or separately acquiring the sum of squares of all absolute differences in each absolute-difference set in the N absolute-difference sets to obtain the N prediction errors of the basic prediction unit, or separately acquiring high-order norms of all absolute differences in each absolute-difference set in the N absolute-difference sets to obtain the N prediction errors of the basic prediction unit.

According to a second aspect, a video encoding method is provided, which is applied to an encoder end and includes determining N pieces of motion information of a target area, where N is an integer greater than or equal to 2, separately performing a motion compensation operation on the target area by using each piece of motion information in the N pieces of motion information to obtain N predictions of the target area, where each prediction in the N predictions of the target area includes predicted values of all sampling points in the target area, acquiring a prediction selection reference of the target area, where the prediction selection reference of the target area is values of all sampling points in a corresponding reference area of the target area, and determining a final prediction of the target area according to the N predictions of the target area and the prediction selection reference of the target area.

With reference to the second aspect, in a first possible implementation manner, the target area consists of M basic prediction units, where M is greater than or equal to 2, and the determining a final prediction of the target area according to the N predictions of the target area and the prediction selection reference of the target area includes determining a final prediction of the basic prediction unit according to N predictions of the basic prediction unit and a prediction selection reference of the basic prediction unit, where each prediction in the N predictions of the basic prediction unit consists of predicted values of all sampling points in the basic prediction unit, and the prediction selection reference of the basic prediction unit is values of all sampling points of a reference area corresponding to the basic prediction unit.

With reference to the first possible implementation manner, in a second possible implementation manner, the determining a final prediction of the basic prediction unit according to N predictions of the basic prediction unit and a prediction selection reference of the basic prediction unit includes calculating N prediction errors of the basic prediction unit according to the N predictions of the basic prediction unit and the prediction selection reference of the basic prediction unit, and comparing the N prediction errors of the basic prediction unit, and acquiring a prediction, corresponding to a minimum prediction error, of the basic prediction unit as the final prediction of the basic prediction unit.

With reference to the first possible implementation manner, in a third possible implementation manner, the determining a final prediction of the basic prediction unit according to N predictions of the basic prediction unit and a prediction selection reference of the basic prediction unit includes determining N weighting factors of the basic prediction unit according to the N predictions of the basic prediction unit and the prediction selection reference of the basic prediction unit, and performing weighted averaging on the N predictions of the basic prediction unit by using the N weighting factors to obtain the final prediction of the basic prediction unit.

With reference to the third possible implementation manner, in a fourth possible implementation manner, the determining N weighting factors of the basic prediction unit according to the N predictions of the basic prediction unit and the prediction selection reference of the basic prediction unit includes calculating N prediction errors of the basic prediction unit according to the N predictions of the basic prediction unit and the prediction selection reference of the basic prediction unit, and separately obtaining reciprocals of the N prediction errors of the basic prediction unit to obtain the N weighting factors of the basic prediction unit.

With reference to the second or fourth possible implementation manner, in a fifth possible implementation manner, the basic prediction unit consists of one or more sampling points.

With reference to the second or fourth possible implementation manner, in a sixth possible implementation manner, when the basic prediction unit consists of one sampling point, the calculating N prediction errors of the basic prediction unit according to the N predictions of the basic prediction unit and the prediction selection reference of the basic prediction unit includes separately obtaining absolute differences between values of the sampling point in the N predictions of the basic prediction unit and a value of the sampling point in the prediction selection reference of the basic prediction unit to obtain the N prediction errors of the basic prediction unit, or separately obtaining squares of differences between values of the sampling point in the N predictions of the basic prediction unit and a value of the sampling point in the prediction selection reference of the basic prediction unit to obtain the N prediction errors of the basic prediction unit.

With reference to the second or fourth possible implementation manner, in a seventh possible implementation manner, when the basic prediction unit consists of one sampling point, the calculating N prediction errors of the basic prediction unit according to the N predictions of the basic prediction unit and the prediction selection reference of the basic prediction unit includes separately obtaining differences between values of the sampling point in the N predictions of the basic prediction unit and a value of the sampling point in the prediction selection reference of the basic prediction unit, performing filtering processing on each of the differences, and obtaining absolute values, to obtain the N prediction errors of the basic prediction unit, or separately performing filtering processing on values of the sampling point in the N predictions of the basic prediction unit, performing filtering processing on a value of the sampling point in the prediction selection reference of the basic prediction unit, and separately obtaining absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

With reference to the second or fourth possible implementation manner, in an eighth possible implementation manner, when the basic prediction unit consists of multiple sampling points, the calculating N prediction errors of the basic prediction unit according to the N predictions of the basic prediction unit and the prediction selection reference of the basic prediction unit includes separately obtaining absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit, and separately acquiring the sum of all absolute differences in each absolute-difference set in the N absolute-difference sets to obtain the N prediction errors of the basic prediction unit, or separately acquiring the sum of squares of all absolute differences in each absolute-difference set in the N absolute-difference sets to obtain the N prediction errors of the basic prediction unit, or separately acquiring high-order norms of all absolute differences in each absolute-difference set in the N absolute-difference sets to obtain the N prediction errors of the basic prediction unit.

With reference to the second aspect and the first to eighth possible implementation manners, in a ninth possible implementation manner, the determining N pieces of motion information of a target area includes acquiring N candidate motion information sets of the target area, where each of the candidate motion information sets has at least 1 piece of candidate motion information, separately selecting 1 piece of candidate motion information from each candidate motion information set in the N candidate motion information sets, to obtain W motion information combinations, where each of the motion information combinations has N pieces of motion information, separately performing a motion compensation operation on the target area by using each motion information combination in the W motion information combinations to obtain W prediction combinations, where each of the prediction combinations includes the N predictions of the target area, acquiring the prediction selection reference, separately comparing the N predictions of the target area in each of the prediction combinations with the prediction selection reference to determine an optimal prediction meeting a preset condition, and determining N pieces of motion information in a motion information combination corresponding to the optimal prediction as the N pieces of motion information of the target area.

With reference to the second aspect and the first to ninth possible implementation manners, in a tenth possible implementation manner, after the determining N pieces of motion information of a target area, the method further includes obtaining N pieces of motion-related information according to the N pieces of motion information, and converting the N pieces of motion-related information into a binary string and writing the binary string to a bitstream.

According to a third aspect, a video decoding apparatus is provided, including a first acquiring unit configured to acquire N pieces of motion information of a target area according to motion-related information in a bitstream generated by an encoder end, where N is an integer greater than or equal to 2, a compensating unit configured to separately perform a motion compensation operation on the target area by using each piece of motion information in the N pieces of motion information to obtain N predictions of the target area, where each prediction in the N predictions of the target area includes predicted values of all sampling points in the target area, a second acquiring unit configured to acquire a prediction selection reference of the target area, where the prediction selection reference of the target area is values of all sampling points in a corresponding reference area of the target area, and a determining unit configured to determine a final prediction of the target area according to the N predictions of the target area and the prediction selection reference of the target area.

With reference to the third aspect, in a first possible implementation manner, the target area consists of M basic prediction units, where M is greater than or equal to 2, and the determining unit is configured to determine a final prediction of the basic prediction unit according to N predictions of the basic prediction unit and a prediction selection reference of the basic prediction unit, where each prediction in the N predictions of the basic prediction unit consists of predicted values of all sampling points in the basic prediction unit, and the prediction selection reference of the basic prediction unit is values of all sampling points of a reference area corresponding to the basic prediction unit.

With reference to the first possible implementation manner, in a second possible implementation manner, the determining unit includes a processing subunit configured to calculate N prediction errors of the basic prediction unit according to the N predictions of the basic prediction unit and the prediction selection reference of the basic prediction unit, and a comparing subunit configured to compare the N prediction errors of the basic prediction unit, and acquire a prediction, corresponding to a minimum prediction error, of the basic prediction unit as the final prediction of the basic prediction unit.

With reference to the first possible implementation manner, in a third possible implementation manner, the determining unit includes a determining subunit configured to determine N weighting factors of the basic prediction unit according to the N predictions of the basic prediction unit and the prediction selection reference of the basic prediction unit, and an acquiring subunit configured to perform weighted averaging on the N predictions of the basic prediction unit by using the N weighting factors to obtain the final prediction of the basic prediction unit.

With reference to the third possible implementation manner, in a fourth possible implementation manner, the determining subunit is configured to calculate N prediction errors of the basic prediction unit according to the N predictions of the basic prediction unit and the prediction selection reference of the basic prediction unit, and separately obtain reciprocals of the N prediction errors of the basic prediction unit to obtain the N weighting factors of the basic prediction unit.

With reference to the second or fourth possible implementation manner, in a fifth possible implementation manner, the basic prediction unit consists of one or more sampling points.

With reference to the second or fourth possible implementation manner, in a sixth possible implementation manner, when the basic prediction unit consists of one sampling point, the processing subunit or the determining subunit is configured to separately obtain absolute differences between values of the sampling point in the N predictions of the basic prediction unit and a value of the sampling point in the prediction selection reference of the basic prediction unit to obtain the N prediction errors of the basic prediction unit, or separately obtain squares of differences between values of the sampling point in the N predictions of the basic prediction unit and a value of the sampling point in the prediction selection reference of the basic prediction unit to obtain the N prediction errors of the basic prediction unit.

With reference to the second or fourth possible implementation manner, in a seventh possible implementation manner, when the basic prediction unit consists of one sampling point, the processing subunit or the determining subunit is configured to separately obtain differences between values of the sampling point in the N predictions of the basic prediction unit and a value of the sampling point in the prediction selection reference of the basic prediction unit, perform filtering processing on each of the differences, and obtain absolute values, to obtain the N prediction errors of the basic prediction unit, or separately perform filtering processing on values of the sampling point in the N predictions of the basic prediction unit, perform filtering processing on a value of the sampling point in the prediction selection reference of the basic prediction unit, and separately obtain absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

With reference to the second or fourth possible implementation manner, in an eighth possible implementation manner, when the basic prediction unit consists of multiple sampling points, the processing subunit or the determining subunit is configured to separately obtain absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit, and separately acquire the sum of all absolute differences in each absolute-difference set in the N absolute-difference sets to obtain the N prediction errors of the basic prediction unit, or separately acquire the sum of squares of all absolute differences in each absolute-difference set in the N absolute-difference sets to obtain the N prediction errors of the basic prediction unit, or separately acquire high-order norms of all absolute differences in each absolute-difference set in the N absolute-difference sets to obtain the N prediction errors of the basic prediction unit.

According to a fourth aspect, a video encoding apparatus is provided, including a first acquiring unit configured to determine N pieces of motion information of a target area, where N is an integer greater than or equal to 2, a compensating unit configured to separately perform a motion compensation operation on the target area by using each piece of motion information in the N pieces of motion information to obtain N predictions of the target area, where each prediction in the N predictions of the target area includes predicted values of all sampling points in the target area, a second acquiring unit configured to acquire a prediction selection reference of the target area, where the prediction selection reference of the target area is values of all sampling points in a corresponding reference area of the target area, and a determining unit configured to determine a final prediction of the target area according to the N predictions of the target area and the prediction selection reference of the target area.

With reference to the fourth aspect, in a first possible implementation manner, the target area consists of M basic prediction units, where M is greater than or equal to 2, and the determining unit is configured to determine a final prediction of the basic prediction unit according to N predictions of the basic prediction unit and a prediction selection reference of the basic prediction unit, where each prediction in the N predictions of the basic prediction unit consists of predicted values of all sampling points in the basic prediction unit, and the prediction selection reference of the basic prediction unit is values of all sampling points of a reference area corresponding to the basic prediction unit.

With reference to the first possible implementation manner, in a second possible implementation manner, the determining unit includes a processing subunit configured to calculate N prediction errors of the basic prediction unit according to the N predictions of the basic prediction unit and the prediction selection reference of the basic prediction unit, and a comparing subunit configured to compare the N prediction errors of the basic prediction unit, and acquire a prediction, corresponding to a minimum prediction error, of the basic prediction unit as the final prediction of the basic prediction unit.

With reference to the first possible implementation manner, in a third possible implementation manner, the determining unit includes a determining subunit configured to determine N weighting factors of the basic prediction unit according to the N predictions of the basic prediction unit and the prediction selection reference of the basic prediction unit, and an acquiring subunit configured to perform weighted averaging on the N predictions of the basic prediction unit by using the N weighting factors to obtain the final prediction of the basic prediction unit.

With reference to the third possible implementation manner, in a fourth possible implementation manner, the determining subunit is configured to calculate N prediction errors of the basic prediction unit according to the N predictions of the basic prediction unit and the prediction selection reference of the basic prediction unit, and separately obtain reciprocals of the N prediction errors of the basic prediction unit to obtain the N weighting factors of the basic prediction unit.

With reference to the second or fourth possible implementation manner, in a fifth possible implementation manner, the basic prediction unit consists of one or more sampling points.

With reference to the second or fourth possible implementation manner, in a sixth possible implementation manner, when the basic prediction unit consists of one sampling point, the processing subunit or the determining subunit is configured to separately obtain absolute differences between values of the sampling point in the N predictions of the basic prediction unit and a value of the sampling point in the prediction selection reference of the basic prediction unit to obtain the N prediction errors of the basic prediction unit, or separately obtain squares of differences between values of the sampling point in the N predictions of the basic prediction unit and a value of the sampling point in the prediction selection reference of the basic prediction unit to obtain the N prediction errors of the basic prediction unit.

With reference to the second or fourth possible implementation manner, in a seventh possible implementation manner, when the basic prediction unit consists of one sampling point, the processing subunit or the determining subunit is configured to separately obtain differences between values of the sampling point in the N predictions of the basic prediction unit and a value of the sampling point in the prediction selection reference of the basic prediction unit, perform filtering processing on each of the differences, and obtain absolute values, to obtain the N prediction errors of the basic prediction unit, or separately perform filtering processing on values of the sampling point in the N predictions of the basic prediction unit, perform filtering processing on a value of the sampling point in the prediction selection reference of the basic prediction unit, and separately obtain absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

With reference to the second or fourth possible implementation manner, in an eighth possible implementation manner, when the basic prediction unit consists of multiple sampling points, the processing subunit or the determining subunit is configured to separately obtain absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit, and separately acquire the sum of all absolute differences in each absolute-difference set in the N absolute-difference sets to obtain the N prediction errors of the basic prediction unit, or separately acquire the sum of squares of all absolute differences in each absolute-difference set in the N absolute-difference sets to obtain the N prediction errors of the basic prediction unit, or separately acquire high-order norms of all absolute differences in each absolute-difference set in the N absolute-difference sets to obtain the N prediction errors of the basic prediction unit.

With reference to the second aspect and the first to eighth possible implementation manners, in a ninth possible implementation manner, the first acquiring unit is configured to acquire N candidate motion information sets of the target area, where each of the candidate motion information sets has at least 1 piece of candidate motion information, separately select 1 piece of candidate motion information from each candidate motion information set in the N candidate motion information sets, to obtain W motion information combinations, where each of the motion information combinations has N pieces of motion information, separately perform a motion compensation operation on the target area by using each motion information combination in the W motion information combinations to obtain W prediction combinations, where each of the prediction combinations includes the N predictions of the target area, acquire the prediction selection reference, separately compare the N predictions of the target area in each of the prediction combinations with the prediction selection reference to determine an optimal prediction meeting a preset condition, and determine N pieces of motion information in a motion information combination corresponding to the optimal prediction as the N pieces of motion information of the target area.

With reference to the second aspect and the first to ninth possible implementation manners, in a tenth possible implementation manner, the apparatus further includes a third acquiring unit configured to after the final prediction of the target area is determined according to the N predictions of the target area and the prediction selection reference of the target area, obtain N pieces of motion-related information according to the N pieces of motion information, and a writing unit configured to convert the N pieces of motion-related information into a binary string and write the binary string to a bitstream.

The embodiments of the present disclosure provide a video encoding method and decoding method and apparatuses. The video decoding method, applied to a decoder end, includes: acquiring N pieces of motion information of a target area according to motion-related information in a bitstream generated by an encoder end, where N is an integer greater than or equal to 2; separately performing a motion compensation operation on the target area by using each piece of motion information in the N pieces of motion information to obtain N predictions of the target area, where each prediction in the N predictions of the target area includes predicted values of all sampling points in the target area; acquiring a prediction selection reference of the target area, where the prediction selection reference of the target area is values of all sampling points in a corresponding reference area of the target area; and determining a final prediction of the target area according to the N predictions of the target area and the prediction selection reference of the target area. In this way, a preset quantity of pieces of motion information exist for one target area, and a final prediction of the target area is determined according to predictions obtained according to the preset quantity of pieces of motion information and a prediction selection reference. As compared with the, picture partition does not need to be performed; moreover, multiple predictions obtained according to descriptions that are of one same target area and indicated by multiple pieces of motion information are more accurate, and the final prediction of the target area determined according to the multiple predictions and the prediction selection reference has higher accuracy. Therefore, video decoding performance can be enhanced, and decoding precision can be improved.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
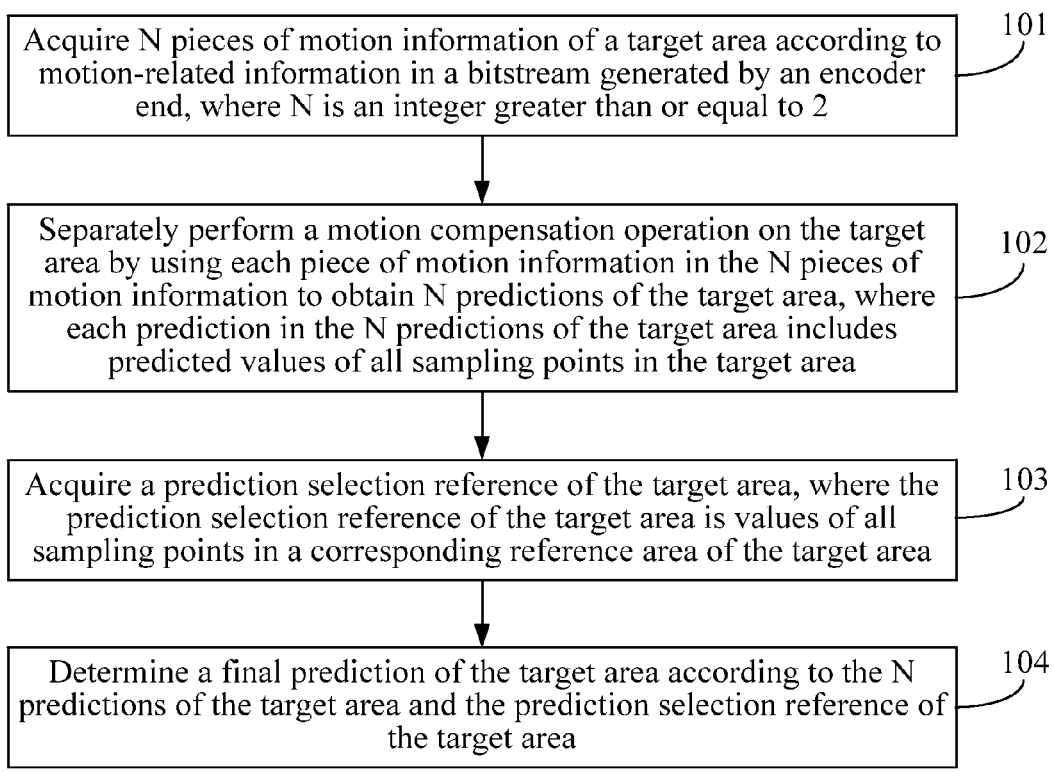
FIG. 1 is a flowchart of a video decoding method according to an embodiment of the present disclosure.

An embodiment of the present disclosure provides a video decoding method, applied to a decoder end. As shown in FIG. 1, the method includes 101: Acquire N pieces of motion information of a target area according to motion-related information in a bitstream generated by an encoder end, where N is an integer greater than or equal to 2.

Particularly, the target area may consist of M basic prediction units, where M is greater than or equal to 2.

102: Separately perform a motion compensation operation on the target area by using each piece of motion information in the N pieces of motion information to obtain N predictions of the target area, where each prediction in the N predictions of the target area includes predicted values of all sampling points in the target area.

Because the target area consists of multiple basic prediction units, when the N predictions of the target area are determined, correspondingly, N predictions of a basic prediction unit are determined accordingly, where the basic prediction unit is any one of the multiple basic prediction units of the target area.

103: Acquire a prediction selection reference of the target area, where the prediction selection reference of the target area is values of all sampling points in a corresponding reference area of the target area.

The reference area of the target area is a picture area corresponding to the target area, and may be a picture block matching the target area in terms of a content feature. Correspondingly, the reference area of the target area may also be considered to consist of multiple basic prediction units. In this embodiment of the present disclosure, values of all sampling points in a basic prediction unit that is in the reference area of the target area and is located at a same position as a basic prediction unit of the target area are referred to as a prediction selection reference of the basic prediction unit.

104: Determine a final prediction of the target area according to the N predictions of the target area and the prediction selection reference of the target area.

Exemplarily, a final prediction of the basic prediction unit may be determined according to the N predictions of the basic prediction unit and the prediction selection reference of the basic prediction unit; because the target area consists of the multiple basic prediction units, after the final prediction of the basic prediction unit is determined, the final prediction of the target area is determined accordingly.

In this way, a preset quantity of pieces of motion information exist for one target area, and a final prediction of the target area is determined according to predictions obtained according to the preset quantity of pieces of motion information and a prediction selection reference. As compared with the, picture partition does not need to be performed; moreover, multiple predictions obtained according to descriptions that are of one same target area and indicated by multiple pieces of motion information are more accurate, and the final prediction of the target area determined according to the multiple predictions and the prediction selection reference has higher accuracy. Therefore, video decoding performance can be enhanced, and decoding precision can be improved.

Further, that a final prediction of the basic prediction unit may be determined according to the N predictions of the basic prediction unit and the prediction selection reference of the basic prediction unit may include calculating N prediction errors of the basic prediction unit according to the N predictions of the basic prediction unit and the prediction selection reference of the basic prediction unit; and comparing the N prediction errors of the basic prediction unit, and acquiring a prediction, corresponding to a minimum prediction error, of the basic prediction unit as the final prediction of the basic prediction unit.

It should be noted that, in step 104, the final prediction of the target area may also be determined by using a method in which a weighting factor is acquired. N weighting factors of the basic prediction unit may be first determined according to the N predictions of the basic prediction unit and the prediction selection reference of the basic prediction unit, for example, N prediction errors of the basic prediction unit are calculated according to the N predictions of the basic prediction unit and the prediction selection reference of the basic prediction unit, and reciprocals of the N prediction errors of the basic prediction unit are separately obtained to obtain the N weighting factors of the basic prediction unit. Then, weighted averaging may be performed on the N predictions of the basic prediction unit by using the N weighting factors to obtain the final prediction of the basic prediction unit.

In this embodiment of the present disclosure, the basic prediction unit may consist of one or more sampling points, where the "multiple" is at least two. Particularly, a spatial correspondence exists between the basic prediction unit and a reference area of the basic prediction unit, and a spatial correspondence also exists between the N predictions of the basic prediction unit. Because the basic prediction unit may consist of different quantities of sampling points, correspondingly, methods for obtaining the N prediction errors of the basic prediction unit are also different.

Exemplarily, when the basic prediction unit consists of one sampling point, it may be separately obtaining absolute differences between values of the sampling point in the N predictions of the basic prediction unit and a value of the sampling point in the prediction selection reference of the basic prediction unit to obtain the N prediction errors of the basic prediction unit, where it should be noted that, the absolute differences refer to absolute values of differences; or separately obtaining squares of differences between values of the sampling point in the N predictions of the basic prediction unit and a value of the sampling point in the prediction selection reference of the basic prediction unit to obtain the N prediction errors of the basic prediction unit.

When the basic prediction unit consists of one sampling point, it may also be separately obtaining differences between values of the sampling point in the N predictions of the basic prediction unit and a value of the sampling point in the prediction selection reference of the basic prediction unit, performing filtering processing on each of the differences, and obtaining absolute values, to obtain the N prediction errors of the basic prediction unit; or separately performing filtering processing on values of the sampling point in the N predictions of the basic prediction unit, performing filtering processing on a value of the sampling point in the prediction selection reference of the basic prediction unit, and separately obtaining absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

Particularly, when the basic prediction unit consists of multiple sampling points, it may be first separately obtaining absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit; and then separately acquiring the sum of all absolute differences in each absolute-difference set in the N absolute-difference sets to obtain the N prediction errors of the basic prediction unit; or separately acquiring the sum of squares of all absolute differences in each absolute-difference set in the N absolute-difference sets to obtain the N prediction errors of the basic prediction unit; or separately acquiring high-order norms of all absolute differences in each absolute-difference set in the N absolute-difference sets to obtain the N prediction errors of the basic prediction unit.

Figure 2:
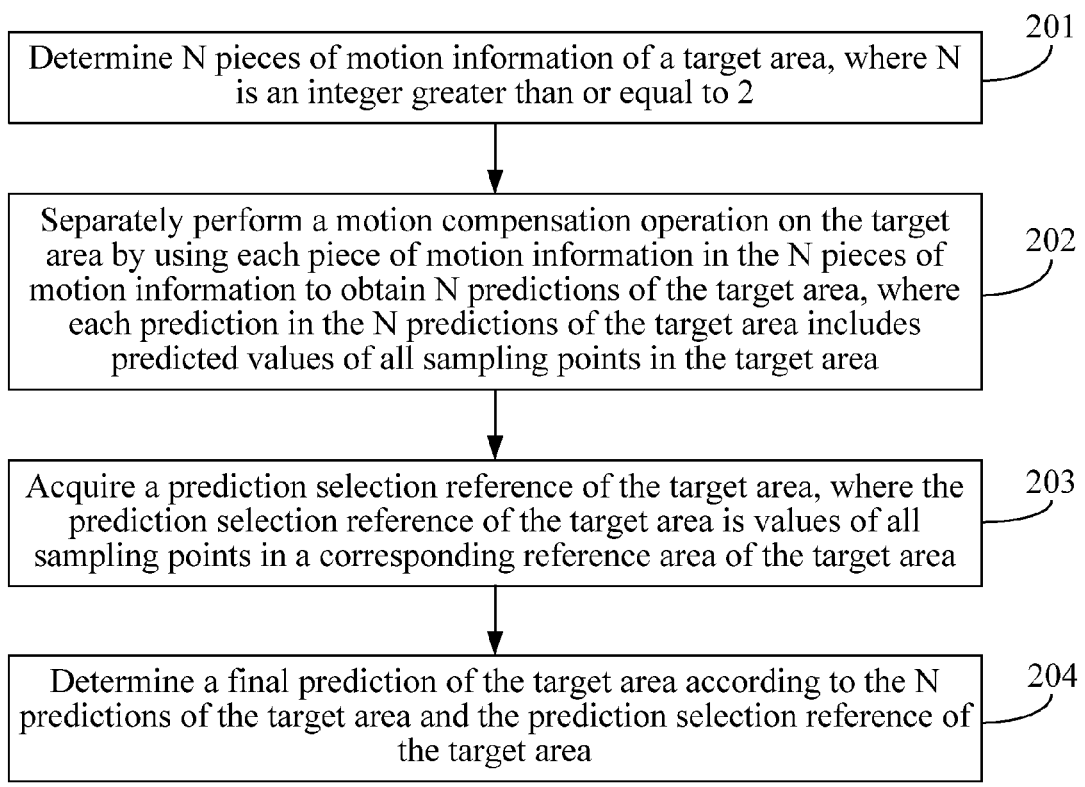
FIG. 2 is a flowchart of a video encoding method according to an embodiment of the present disclosure.

An embodiment of the present disclosure provides a video encoding method, applied to an encoder end. As shown in FIG. 2, the method includes 201: Determine N pieces of motion information of a target area, where N is an integer greater than or equal to 2.

It may be acquiring N candidate motion information sets of the target area, where each of the candidate motion information sets has at least 1 piece of candidate motion information; separately selecting 1 piece of candidate motion information from each candidate motion information set in the N candidate motion information sets, to obtain W motion information combinations, where each of the motion information combinations has N pieces of motion information; separately performing a motion compensation operation on the target area by using each motion information combination in the W motion information combinations to obtain W prediction combinations, where each of the prediction combinations includes N predictions of the target area; acquiring a prediction selection reference; separately comparing the N predictions of the target area in each of the prediction combinations with the prediction selection reference to determine an optimal prediction meeting a preset condition; and determining N pieces of motion information in a motion information combination corresponding to the optimal prediction as the N pieces of motion information of the target area.

Particularly, the target area may consist of M basic prediction units, where M is greater than or equal to 2.

202: Separately perform a motion compensation operation on the target area by using each piece of motion information in the N pieces of motion information to obtain N predictions of the target area, where each prediction in the N predictions of the target area includes predicted values of all sampling points in the target area.

Because the target area consists of multiple basic prediction units, when the N predictions of the target area are determined, correspondingly, N predictions of a basic prediction unit are determined accordingly, where the basic prediction unit is any one of the multiple basic prediction units of the target area.

203: Acquire a prediction selection reference of the target area, where the prediction selection reference of the target area is values of all sampling points in a corresponding reference area of the target area.

204: Determine a final prediction of the target area according to the N predictions of the target area and the prediction selection reference of the target area.

Exemplarily, a final prediction of the basic prediction unit may be determined according to the N predictions of the basic prediction unit and the prediction selection reference of the basic prediction unit; because the target area consists of the multiple basic prediction units, after the final prediction of the basic prediction unit is determined, the final prediction of the target area is determined accordingly.

In this way, a preset quantity of pieces of motion information exist for one target area, and a final prediction of the target area is determined according to predictions obtained according to the preset quantity of pieces of motion information and a prediction selection reference. As compared with the, picture partition does not need to be performed; moreover, multiple predictions obtained according to descriptions that are of one same target area and indicated by multiple pieces of motion information are more accurate, and the final prediction of the target area determined according to the multiple predictions and the prediction selection reference has higher accuracy. Therefore, video encoding performance can be enhanced, and encoding precision can be improved.

Further, that a final prediction of the basic prediction unit may be determined according to the N predictions of the basic prediction unit and the prediction selection reference of the basic prediction unit may include calculating N prediction errors of the basic prediction unit according to the N predictions of the basic prediction unit and the prediction selection reference of the basic prediction unit; and comparing the N prediction errors of the basic prediction unit, and acquiring a prediction, corresponding to a minimum prediction error, of the basic prediction unit as the final prediction of the basic prediction unit.

It should be noted that, in step 204, the final prediction of the target area may also be determined by using a method in which a weighting factor is acquired. N weighting factors of the basic prediction unit may be first determined according to the N predictions of the basic prediction unit and the prediction selection reference of the basic prediction unit, for example, N prediction errors of the basic prediction unit are calculated according to the N predictions of the basic prediction unit and the prediction selection reference of the basic prediction unit, and reciprocals of the N prediction errors of the basic prediction unit are separately obtained to obtain the N weighting factors of the basic prediction unit. Then, weighted averaging may be performed on the N predictions of the basic prediction unit by using the N weighting factors to obtain the final prediction of the basic prediction unit.

In this embodiment of the present disclosure, the basic prediction unit may consist of one or more sampling points, where the "multiple" is at least two. Particularly, a spatial correspondence exists between the basic prediction unit and a reference area of the basic prediction unit, and a spatial correspondence also exists between the N predictions of the basic prediction unit. Because the basic prediction unit may consist of different quantities of sampling points, correspondingly, methods for obtaining the N prediction errors of the basic prediction unit are also different.

Exemplarily, when the basic prediction unit consists of one sampling point, it may be separately obtaining absolute differences between values of the sampling point in the N predictions of the basic prediction unit and a value of the sampling point in the prediction selection reference of the basic prediction unit to obtain the N prediction errors of the basic prediction unit; or separately obtaining squares of differences between values of the sampling point in the N predictions of the basic prediction unit and a value of the sampling point in the prediction selection reference of the basic prediction unit to obtain the N prediction errors of the basic prediction unit.

When the basic prediction unit consists of one sampling point, it may also be separately obtaining differences between values of the sampling point in the N predictions of the basic prediction unit and a value of the sampling point in the prediction selection reference of the basic prediction unit, performing filtering processing on each of the differences, and obtaining absolute values, to obtain the N prediction errors of the basic prediction unit; or separately performing filtering processing on values of the sampling point in the N predictions of the basic prediction unit, performing filtering processing on a value of the sampling point in the prediction selection reference of the basic prediction unit, and separately obtaining absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

Particularly, when the basic prediction unit consists of multiple sampling points, it may be separately obtaining absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit; and separately acquiring the sum of all absolute differences in each absolute-difference set in the N absolute-difference sets to obtain the N prediction errors of the basic prediction unit; or separately acquiring the sum of squares of all absolute differences in each absolute-difference set in the N absolute-difference sets to obtain the N prediction errors of the basic prediction unit; or separately acquiring high-order norms of all absolute differences in each absolute-difference set in the N absolute-difference sets to obtain the N prediction errors of the basic prediction unit.

Further, after the N pieces of motion information of the target area are determined, in step 204, the encoder end further needs to obtain N pieces of motion-related information according to the N pieces of motion information, and then convert the N pieces of motion-related information into a binary string and write the binary string to a bitstream, so that a decoder end acquires the bitstream, and decodes the target area according to the N pieces of motion-related information in the bitstream.

Figure 3:
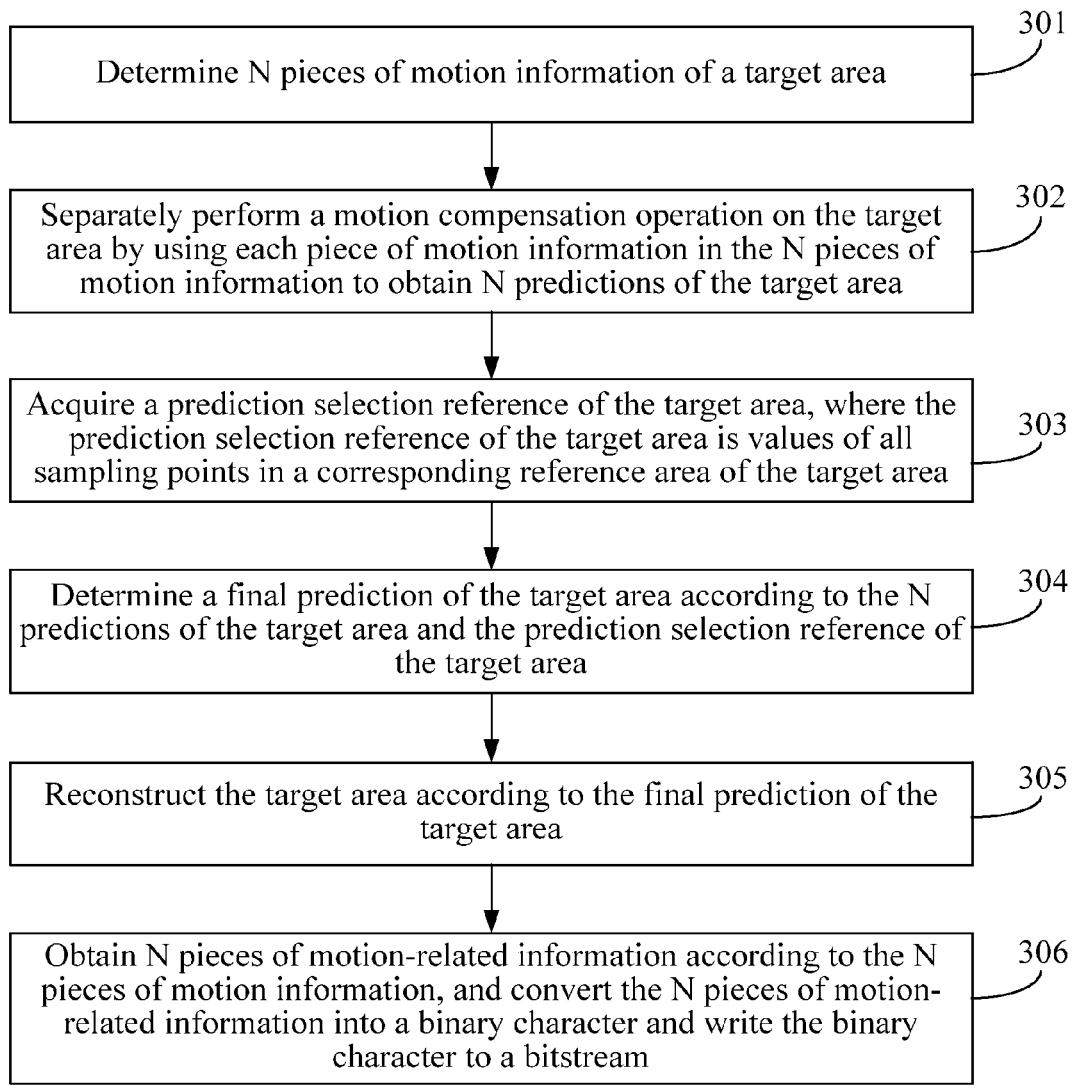
FIG. 3 is a flowchart of another video encoding method according to an embodiment of the present disclosure.

In video encoding and decoding processes, to ensure consistency between an encoded area of a video and an area obtained through decoding, for one same target area, a video encoding process corresponds to a video decoding process. The target area refers to an area in a picture on which current encoding or decoding processing is performed, and may be a rectangular picture block, or may be a contiguous or non-contiguous picture area in any shape. In this embodiment of the present disclosure, it is assumed that the target area is a 4×4 picture block, the picture block has 16 sampling points in total, and each sampling point is 1 pixel. This embodiment of the present disclosure provides another video encoding method, applied to an encoder end. As shown in FIG. 3, the method includes 301: Determine N pieces of motion information of a target area.

In current mainstream video encoding solutions, motion information may include a prediction direction indication, a reference picture index, and a motion vector. Prediction directions may be classified into unidirectional prediction and bidirectional prediction. The unidirectional prediction refers to that a prediction Pred(x,y) of the target area is generated according to only one matching area Blk'(x,y) of the target area, where the matching area of the target area is a picture area matching the target area in terms of a content feature, for example, values of sampling points of the matching area Blk'(x,y) may be directly used as the prediction Pred(x,y). The bidirectional prediction refers to that a prediction of the target area is generated according to two matching areas Blk1'(x,y) and Blk2'(x,y) of the target area, for example, the prediction Pred(x,y) may be a weighted mean of Blk1'(x,y) and Blk2'(x,y). The unidirectional prediction may be further classified into forward prediction and backward prediction. Generally, in a video encoding method, two reference picture lists may exist, which are separately a forward reference picture list, that is, a list 0 (list0) and a backward reference picture list, that is, a list 1 (list 1), where the forward reference picture list and the backward reference picture list are used for managing reference pictures used in encoding a target picture. It should be noted that, the target area is a picture area in the target picture, and a matching area of the target area is a picture area in a reference picture. The forward prediction refers to that a prediction is generated by using a reference picture in the forward reference picture list, that is, the list 0; the backward prediction refers to that a prediction is generated by using a reference picture in the backward reference picture list, that is, the list 1. The bidirectional prediction refers to that a prediction is generated by using reference pictures in both the list 0 and the list 1. When only one reference picture list exists, no prediction direction indication needs to be transmitted. For the unidirectional prediction, the motion information needs to have a reference picture index to indicate a reference picture selected from the list 0 or the list 1; for the bidirectional prediction, the motion information needs to have two reference picture indexes to separately indicate reference pictures selected from the list 0 and the list 1. When a reference picture list includes only one reference picture, no reference picture index needs to be transmitted. The motion vector (MV) includes a horizontal-direction component MVx and a vertical-direction component MVy, and may be recorded as (MVx,MVy). For the unidirectional prediction, one motion vector is required to indicate a displacement of a reference area in a reference picture selected from the list 0 or the list 1; for the bidirectional prediction, two motion vectors are required to separately indicate displacements of two reference areas in a reference picture selected from the list 0 and a reference picture selected from the list 1. In this embodiment of the present disclosure, the motion information may include one or more items of a prediction direction indication, a reference picture index, and a motion vector, which is not limited in the present disclosure. For example, when a prediction direction is the unidirectional prediction, if a reference picture list has only one reference picture, the motion information includes only one motion vector.

It should be noted that, N is an integer greater than or equal to 2, and N may be a preset number. A specific quantity N of pieces of the motion information may be preset on both encoder and decoder ends; or may be randomly set on the encoder end, and the specific quantity N is transmitted to the decoder end. The N pieces of motion information may be extracted at a preset position, or may be obtained through comparison and screening in multiple pieces of candidate motion information.

When the N pieces of motion information are obtained through comparison and screening in multiple pieces of candidate motion information, the motion information fully reflects a motion characteristic of the target area in a video, and therefore the motion information has high accuracy, thereby enhancing video encoding performance, and improving encoding precision.

Figure 4:
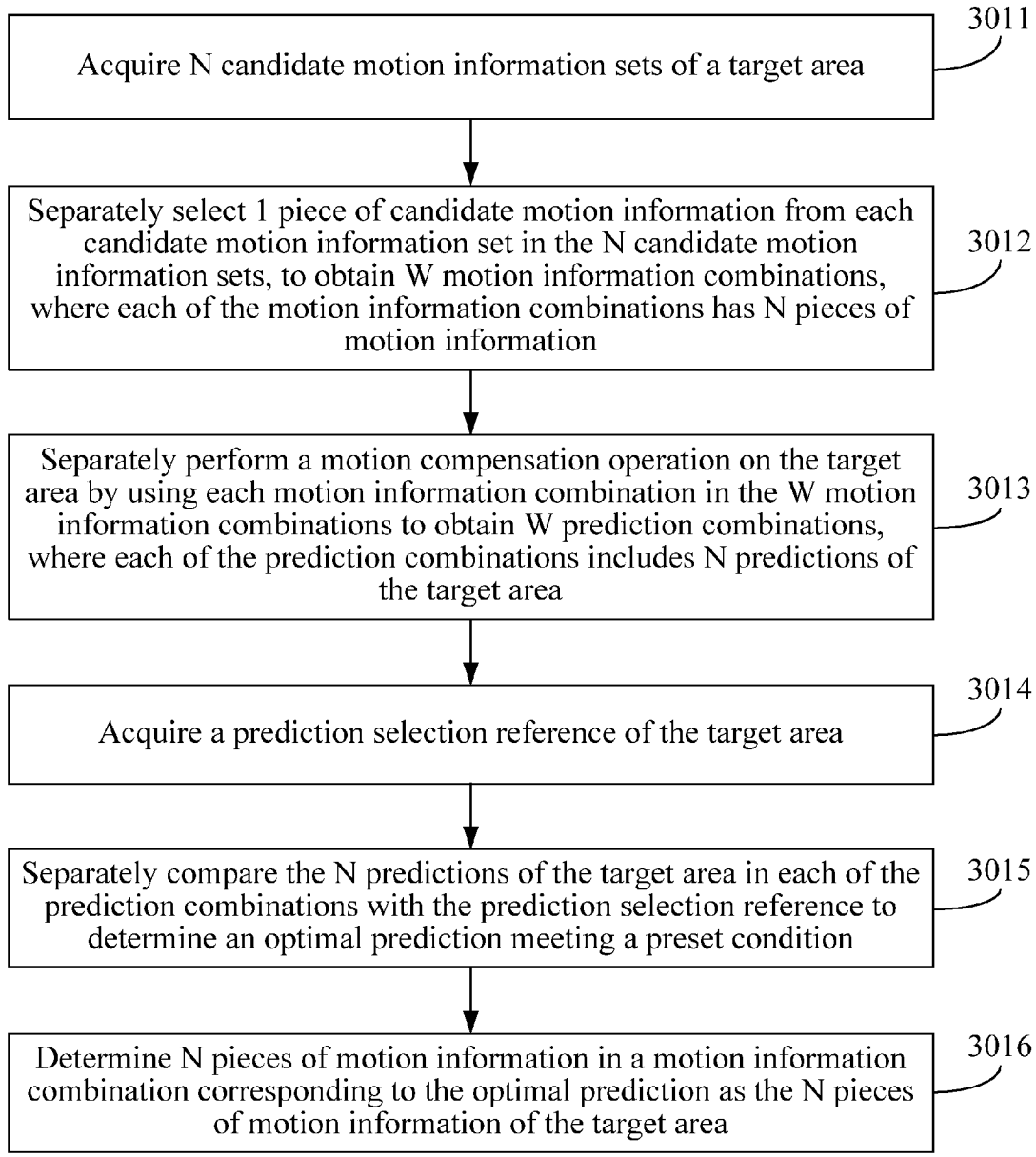
FIG. 4 is a flowchart of a method for acquiring N pieces of motion information of a target area according to an embodiment of the present disclosure.

Exemplarily, as shown in FIG. 4, a method for acquiring the N pieces of motion information of the target area includes 3011: Acquire N candidate motion information sets of the target area.

Particularly, the target area may consist of M basic prediction units, where M is greater than or equal to 2. In this embodiment of the present disclosure, the basic prediction unit may consist of one or more sampling points, where the "multiple" is at least two.

The N candidate motion information sets of the target area may be determined according to a given rule. Exemplarily, a specified search window may be set in a reference picture of the target area, and motion information corresponding to all possible matching blocks of the target area in the specified search window is separately used as candidate motion information in each candidate motion information set. Alternatively, N specified search windows may be set in a reference picture of the target area, and motion information corresponding to all possible matching blocks of the target area in each specified search window in the N specified search windows is separately used as candidate motion information in each candidate motion information set in the N candidate motion information sets. When motion information search is performed in a specified search window, all motion information of the specified search window may be traversed by using a preset motion search algorithm. Exemplarily, the motion search algorithm may be full search, three-step search, diamond search, or the like, which is not limited in the present disclosure.

3012: Separately select 1 piece of candidate motion information from each candidate motion information set in the N candidate motion information sets, to obtain W motion information combinations, where each of the motion information combinations has N pieces of motion information.

For example, assuming that each candidate motion information set in the N candidate motion information sets has K pieces of candidate motion information, the W motion information combinations are obtained by selecting 1 piece of candidate motion information from each candidate motion information set in the N candidate motion information sets and combining the selected candidate motion information, and a quantity W of all possible combinations is equal to the $N^{th}$ power of K.

It should be noted that, quantities of pieces of candidate motion information in each candidate motion information set in the N candidate motion information sets may be different. Exemplarily, it is assumed that N is a preset number, and N is equal to 3, 3 candidate motion information sets of the target area that are determined according to the given rule are candidate motion information sets A, B, and C, where the candidate motion information set A has 1 piece of candidate motion information, the candidate motion information set B has 3 pieces of candidate motion information, and the candidate motion information set C has 2 pieces of candidate motion information; 1 piece of candidate motion information is separately selected from each candidate motion information set of the candidate motion information sets A, B, and C and combined to obtain W motion information combinations; then W=1×3×2=6, and each motion information combination in the 6 motion information combinations has 3 pieces of motion information.

3013: Separately perform a motion compensation operation on the target area by using each motion information combination in the W motion information combinations to obtain W prediction combinations, where each of the prediction combinations includes N predictions of the target area.

In practical application, because each motion information combination includes multiple pieces of motion information, the performing a motion compensation operation on the target area by using each motion information combination in the W motion information combinations to obtain W prediction combinations is obtaining corresponding predictions of the target area according to the multiple pieces of motion information, where there are multiple existing methods for obtaining a prediction of a target area according to a given piece of motion information, and for a method used in this embodiment of the present disclosure, reference may be made to any one of the methods for obtaining a prediction of a target area.

Exemplarily, it is assumed that motion information t is a piece of motion information in any motion information combination in the W motion information combinations. When the motion information t is used to perform a motion compensation operation on the target area to obtain a corresponding prediction of the target area, if a prediction direction indication in the motion information t indicates unidirectional prediction, one matching area may be determined according to the motion information t; if a prediction direction indication in the motion information t indicates bidirectional prediction, two matching areas may be determined according to the motion information t. When one matching area is obtained, values of sampling points of the matching area, that is, sampling values, may be used as a prediction of the target area after proper processing; or values of sampling points of the matching area may be directly used as a prediction of the target area. When two matching areas are obtained, values of sampling points of the two matching areas may be used as a prediction of the target area after weighted averaging or another processing operation.

Figure 5:
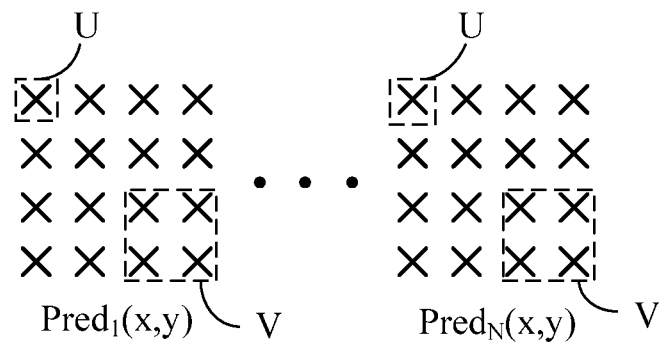
FIG. 5 is a schematic diagram of N predictions in each prediction combination according to an embodiment of the present disclosure.

Because the target area in this embodiment of the present disclosure is a 4×4 picture block, the N predictions in each prediction combination in the W prediction combinations obtained by performing the motion compensation operation on the target area by using each motion information combination in the W motion information combinations may be those shown in FIG. 5, where the N predictions are separately $Pred_1(x,y)$ to $Pred_N(x,y)$, where $Pred_1(x,y)$ is a predicted value of a sampling point at a coordinate position (x,y) in a coordinate system built in a width direction and a height direction of a two-dimensional sampling point array of the target area, x=0 . . . 3, and y=0 . . . 3. A symbol "x" in FIG. 5 represents one sampling point, that is, one pixel. That is, each prediction includes predicted values of all sampling points in the target area.

3014: Acquire a prediction selection reference of the target area.

The prediction selection reference of the target area refers to values of all sampling points in a reference area of the target area. Exemplarily, the prediction selection reference of the target area may be represented by using Ref(x,y), where x and y describe a position of a sampling point in the reference area of the target area, and Ref(x,y) represents a value of a sampling point at a coordinate position (x,y). The reference area of the target area is a picture area corresponding to the target area, and is a picture block matching the target area in terms of a content feature. In the case of scalable video coding or decoding, the reference area may be a picture area, having a spatial correspondence with the target area, in areas in a picture that is at a lower layer relative to a target picture. When the target picture and the lower-layer picture of the target picture have a same resolution, the correspondence may be that the target area and an area in the lower-layer picture have same position coordinates in their respective pictures. When the target picture and the lower-layer picture of the target picture have different resolutions, the correspondence may be considered as that when the two pictures have a same resolution after being scaled properly, the target area and the area in the lower-layer picture have same position coordinates in their respective pictures. In the case of single-layer coding or decoding, the reference area may be an area in a reference picture of a target picture. Generally, a picture content texture feature and motion feature in the reference area both have an extremely high similarity with a picture content texture feature and motion feature in the target area. In the case of single-layer coding or decoding, the reference area may be determined according to one piece of indication information. The indication information may be motion information.

Because the reference area of the target area may also be considered to consist of multiple basic prediction units, in this embodiment of the present disclosure, after the prediction selection reference of the target area is acquired, correspondingly, a prediction selection reference of a basic prediction unit can be obtained.

3015: Separately compare the N predictions of the target area in each of the prediction combinations with the prediction selection reference to determine an optimal prediction meeting a preset condition.

The target area may consist of M basic prediction units, where M is greater than or equal to 2.

Exemplarily, a candidate prediction of the basic prediction unit may be determined according to N predictions of the basic prediction unit in each of the prediction combinations and a prediction selection reference of the basic prediction unit; because the target area consists of multiple basic prediction units, after the candidate prediction of the basic prediction unit is determined, a candidate prediction of the target area corresponding to each of the prediction combinations is determined accordingly.

Further, that a candidate prediction of the basic prediction unit may be determined according to N predictions of the basic prediction unit in each of the prediction combinations and a prediction selection reference of the basic prediction unit may include calculating N prediction errors of the basic prediction unit according to the N predictions of the basic prediction unit and the prediction selection reference of the basic prediction unit; and comparing the N prediction errors of the basic prediction unit, and acquiring a prediction, corresponding to a minimum prediction error, of the basic prediction unit as the candidate prediction of the basic prediction unit.

It should be noted that, the candidate prediction of the target area may also be determined by using a method in which a weighting factor is acquired. N weighting factors of the basic prediction unit may be first determined according to the N predictions of the basic prediction unit and the prediction selection reference of the basic prediction unit, for example, N prediction errors of the basic prediction unit are calculated according to the N predictions of the basic prediction unit and the prediction selection reference of the basic prediction unit, and reciprocals of the N prediction errors of the basic prediction unit are separately obtained to obtain the N weighting factors of the basic prediction unit. Then, weighted averaging may be performed on the N predictions of the basic prediction unit by using the N weighting factors to obtain the candidate prediction of the basic prediction unit.

Because the basic prediction unit may consist of different quantities of sampling points, correspondingly, methods for obtaining the N prediction errors of the basic prediction unit are also different.

Exemplarily, when the basic prediction unit consists of one sampling point, it may be separately obtaining absolute differences between values of the sampling point in the N predictions of the basic prediction unit and a value of the sampling point in the prediction selection reference of the basic prediction unit to obtain the N prediction errors of the basic prediction unit; or separately obtaining squares of differences between values of the sampling point in the N predictions of the basic prediction unit and a value of the sampling point in the prediction selection reference of the basic prediction unit to obtain the N prediction errors of the basic prediction unit.

When the basic prediction unit consists of one sampling point, it may also be separately obtaining differences between values of the sampling point in the N predictions of the basic prediction unit and a value of the sampling point in the prediction selection reference of the basic prediction unit, performing filtering processing on each of the differences, and obtaining absolute values, to obtain the N prediction errors of the basic prediction unit; or separately performing filtering processing on values of the sampling point in the N predictions of the basic prediction unit, performing filtering processing on a value of the sampling point in the prediction selection reference of the basic prediction unit, and separately obtaining absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

Particularly, when the basic prediction unit consists of multiple sampling points, it may be separately obtaining absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit; and separately acquiring the sum of all absolute differences in each absolute-difference set in the N absolute-difference sets to obtain the N prediction errors of the basic prediction unit; or separately acquiring the sum of squares of all absolute differences in each absolute-difference set in the N absolute-difference sets to obtain the N prediction errors of the basic prediction unit; or separately acquiring high-order norms of all absolute differences in each absolute-difference set in the N absolute-difference sets to obtain the N prediction errors of the basic prediction unit.

After the candidate prediction of the target area corresponding to each of the prediction combinations is acquired, each candidate prediction is separately compared with values of sampling points of the target area to determine the optimal prediction meeting the preset condition. prediction errors corresponding to the W prediction combinations may be calculated according to each candidate prediction and the values of the sampling points of the target area, values of prediction errors of all the motion information combinations are further measured according to the preset condition, such as an sum of absolute differences (SAD) or mean square error (MSE) criteria, and a candidate prediction corresponding to a minimum prediction error in the prediction errors is selected as the optimal prediction.

3016: Determine N pieces of motion information in a motion information combination corresponding to the optimal prediction as the N pieces of motion information of the target area.

302: Separately perform a motion compensation operation on the target area by using each piece of motion information in the N pieces of motion information to obtain N predictions of the target area.

Each prediction of the target area in the N predictions of the target area includes predicted values of all sampling points in the target area.

In practical application, the performing a motion compensation operation on the target area by using each piece of motion information in the N pieces of motion information to obtain N predictions of the target area is obtaining a corresponding prediction of the target area according to each piece of motion information, where there are multiple existing methods for obtaining a prediction of a target area according to a given piece of motion information, and for a method used in this embodiment of the present disclosure, reference may be made to any one of the methods for obtaining a prediction of a target area.

Exemplarily, it is assumed that motion information s is any piece of motion information in the N pieces of motion information. When the motion information s is used to perform a motion compensation operation on the target area to obtain a corresponding prediction of the target area, if the motion information s indicates a unidirectional prediction operation, one matching area may be determined according to the motion information s; if the motion information s indicates a bidirectional prediction operation, two matching areas may be determined according to the motion information s. When one matching area is obtained, values of sampling points of the matching area, that is, sampling values, may be used as a prediction of the target area after proper processing; or values of sampling points of the matching area may be directly used as a prediction of the target area. When two matching areas are obtained, values of sampling points of the two matching areas may be used as a prediction of the target area after weighted averaging or another processing operation.

Because the target area in this embodiment of the present disclosure is a 4×4 picture block, the N predictions obtained by performing the motion compensation operation on the target area by using each piece of motion information in the N pieces of motion information may also be those shown in FIG. 5, where the N predictions are separately Pred1(x,y) to PredN(x,y), where Pred1(x,y) is a predicted value of a sampling point at a coordinate position (x,y) in a coordinate system built in a width direction and a height direction of a two-dimensional sampling point array of the target area, x=0 . . . 3, and y=0 . . . 3. A symbol "x" in FIG. 5 represents one sampling point, that is, one pixel. Because the target area consists of multiple basic prediction units, after the N predictions of the target area are determined, correspondingly, N predictions of each basic prediction unit are determined accordingly. As shown in FIG. 5, if the basic prediction unit consists of one sampling point, assuming that a coordinate position of a sampling point U is (0,3) in the coordinate system built in the width direction and the height direction of the two-dimensional sampling point array of the target area, N predictions of the sampling point U are separately Pred1(0,3) to PredN(0,3). If the basic prediction unit consists of 2×2, that is, 4, sampling points in total, N predictions of the basic prediction unit V are separately values of sampling points of the basic prediction unit at the lower right corner of the target area, for example, the first prediction of the basic prediction unit V may be values of the sampling points, that is, Pred1(2,0), Pred1(2,1), Pred1(3,0), and Pred1(3,1).

303: Acquire a prediction selection reference of the target area, where the prediction selection reference of the target area is values of all sampling points in a corresponding reference area of the target area.

Optionally, for step 303, reference may be made to related description of step 3014 in this embodiment, and details are not described herein again.

304: Determine a final prediction of the target area according to the N predictions of the target area and the prediction selection reference of the target area.

Exemplarily, a final prediction of the basic prediction unit may be determined according to the N predictions of the basic prediction unit and the prediction selection reference of the basic prediction unit.

Further, that a final prediction of the basic prediction unit may be determined according to the N predictions of the basic prediction unit and the prediction selection reference of the basic prediction unit may include calculating N prediction errors of the basic prediction unit according to the N predictions of the basic prediction unit and the prediction selection reference of the basic prediction unit; and comparing the N prediction errors of the basic prediction unit, and acquiring a prediction, corresponding to a minimum prediction error, of the basic prediction unit as the final prediction of the basic prediction unit.

It should be noted that, basic prediction units in the "prediction selection reference of the basic prediction unit" and the "N predictions of the basic prediction unit" in the present disclosure are located at a same position, and have a spatial correlation. It is assumed that the prediction selection reference of the target area is represented by Ref(x,y), N is 3, and the N predictions of the target area are separately Pred1(x,y) to Pred3(x,y). Errors between the 3 predictions of the basic prediction unit and the prediction selection reference of the basic prediction unit are separately obtained to obtain 3 prediction errors of the basic prediction unit. When the basic prediction unit consists of one sampling point, exemplarily, the 3 predictions of the basic prediction unit and the prediction selection reference of the basic prediction unit may be those shown in FIG. 6. For example, a basic prediction unit is a sampling point Q; assuming that a coordinate position of the sampling point Q is (0,3) in the coordinate system built in the width direction and the height direction of the two-dimensional sampling point array of the target area, 3 predictions of the basic prediction unit are separately Pred1(0,3), Pred2(0,3), and Pred3(0,3), and a prediction selection reference of the basic prediction unit is Ref(0,3).

Figure 7:
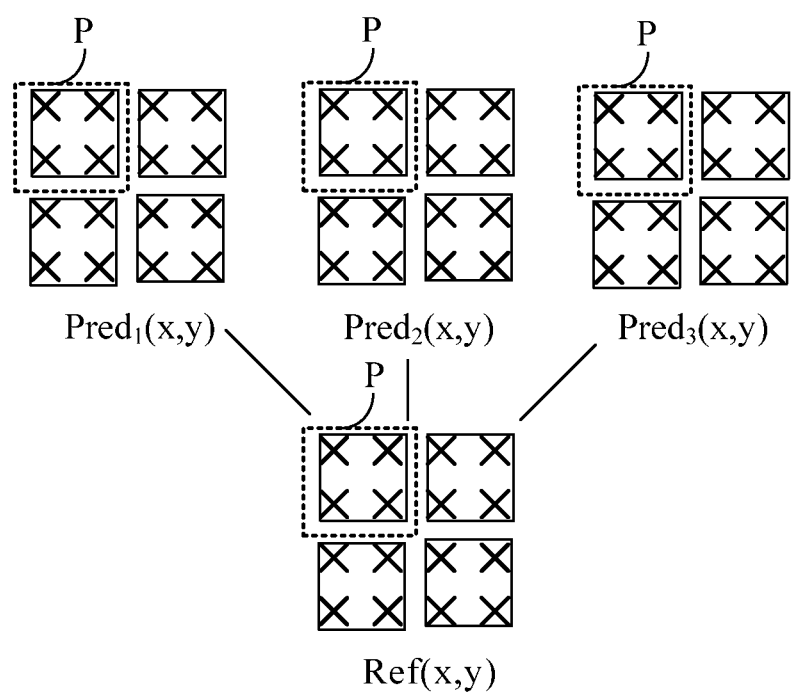
FIG. 7 is a schematic structural diagram of another target area according to an embodiment of the present disclosure.

When the basic prediction unit consists of multiple sampling points, exemplarily, the 3 predictions of the basic prediction unit and the prediction selection reference of the basic prediction unit may be those shown in FIG. 7. It is assumed that the basic prediction unit consists of 2×2, that is, 4, sampling points in total, like a unit consisting of sampling points in a solid-line box in FIG. 7, for example, a basic prediction unit is an area P consisting of sampling points in a dotted-line box. Then, 3 predictions of the basic prediction unit are separately values of the sampling points in the area P at the upper left corner of the target area, for example, the first prediction of the basic prediction unit may be values of the sampling points, that is, $Pred_1(0,2)$, $Pred_1(1,2)$, $Pred_1(0,3)$, and $Pred_1(1,3)$. A prediction selection reference of the basic prediction unit is values of the sampling points, that is, Ref(0,2), Ref(1,2), Ref(0,3), and Ref(1,3).

In this embodiment of the present disclosure, the basic prediction unit may consist of one or more sampling points, where the "multiple" is at least two. Because the basic prediction unit may consist of different quantities of sampling points, correspondingly, methods for obtaining the N prediction errors of the basic prediction unit are also different.

Figure 6:
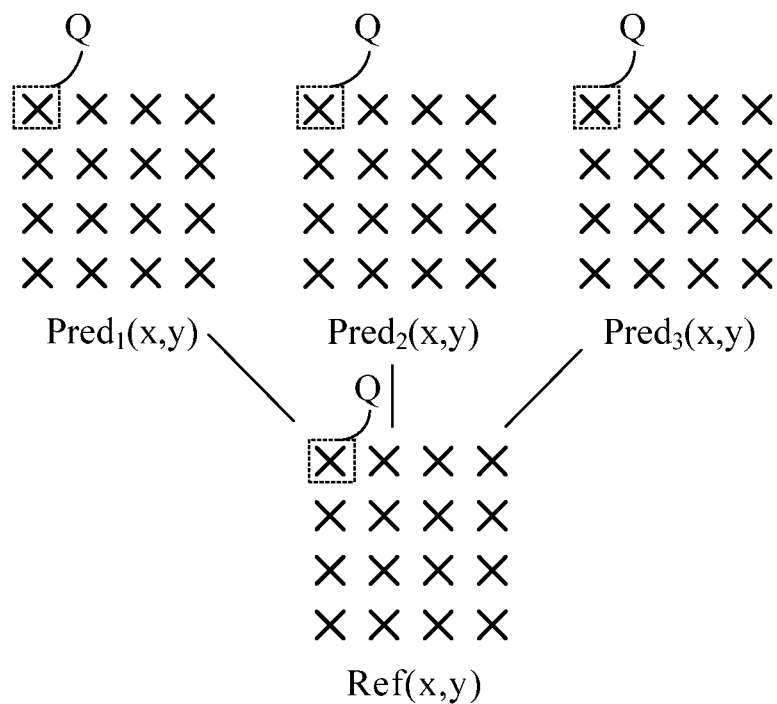
FIG. 6 is a schematic structural diagram of a target area according to an embodiment of the present disclosure.

Exemplarily, when the basic prediction unit consists of one sampling point, it may be separately obtaining absolute differences between values of the sampling point in the N predictions of the basic prediction unit and a value of the sampling point in the prediction selection reference of the basic prediction unit to obtain the N prediction errors of the basic prediction unit. For example, as shown in FIG. 6, for the basic prediction unit that is the sampling point Q, it may be separately obtaining an absolute difference between $Pred_1(0,3)$ and Ref(0,3), an absolute difference between $Pred_2(0,3)$ and Ref(0,3), and an absolute difference between $Pred_3(0,3)$ and Ref(0,3) as the 3 prediction errors of the basic prediction unit.

Alternatively, it may be separately obtaining squares of differences between values of the sampling point in the N predictions of the basic prediction unit and a value of the sampling point in the prediction selection reference of the basic prediction unit to obtain the N prediction errors of the basic prediction unit. For example, as shown in FIG. 6, for the basic prediction unit that is the sampling point Q, it may be separately obtaining a square of a difference between $Pred_1(0,3)$ and Ref(0,3), a square of a difference between $Pred_2(0,3)$ and Ref(0,3), and a square of a difference between $Pred_3(0,3)$ and Ref(0,3) as the 3 prediction errors of the basic prediction unit.

When the basic prediction unit consists of one sampling point, it may also be separately obtaining differences between values of the sampling point in the N predictions of the basic prediction unit and a value of the sampling point in the prediction selection reference of the basic prediction unit, performing filtering processing on each of the differences, and obtaining absolute values, to obtain the N prediction errors of the basic prediction unit. That is, it may be performing filtering processing to determine a difference of the sampling point at a position (x,y) with the help of differences of sampling points at neighboring positions, such as (x,y−1), (x−1,y), (x+1,y), and (x,y+1), of the sampling point at the position (x,y), and then obtaining an absolute value of the difference. For example, as shown in FIG. 6, for the basic prediction unit that is the sampling point Q, it may be separately obtaining a difference between $Pred_1(0,3)$ and Ref(0,3), a difference between $Pred_2(0,3)$ and Ref(0,3), and a difference between $Pred_3(0,3)$ and Ref(0,3), and then performing filtering processing on the 3 differences. It should be noted that, when the 3 differences are obtained, differences of another basic prediction unit in the target area are also obtained correspondingly, and an obtaining method is the same as a difference obtaining method when the basic prediction unit is the sampling point Q; in this way, only after differences of all the basic prediction units in the target area are obtained, filtering processing can be performed and absolute values can be obtained to obtain 3 prediction errors of each basic prediction unit, for example, when filtering processing is performed on the difference between $Pred_1(0,3)$ and Ref(0,3) and an absolute value is obtained, differences of sampling points at neighboring positions (0,2) and (1,3) of the position (0,3) of the sampling point Q, which are separately a difference between $Pred_1(0,2)$ and Ref(0,3) and a difference between $Pred_1(1,3)$ and Ref(0,3), may be obtained; then, with the help of the two differences and according to a preset criteria, a difference of the basic prediction unit that is the sampling point Q after the filtering is determined, and an absolute value of the difference after the filtering is obtained to obtain 1 prediction error of the basic prediction unit that is the sampling point Q.

Alternatively, it may be separately performing filtering processing on values of the sampling point in the N predictions of the basic prediction unit, performing filtering processing on a value of the sampling point in the prediction selection reference of the basic prediction unit, and separately obtaining absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit. For example, as shown in FIG. 6, for the basic prediction unit that is the sampling point Q, it may be separately acquiring values of sampling points at neighboring positions (0,2) and (1,3) of the position (0,3) of the sampling point Q in the target area, then determining, with the help of the values of the two sampling points and according to a preset criteria, a value of the sampling point of the basic prediction unit that is the sampling point Q, then separately acquiring values, in the prediction selection reference of the target area, of the sampling points at the neighboring positions (0,2) and (1,3) of the position (0,3) of the sampling point Q, then determining, with the help of the values of the two sampling points and according to a preset criteria, a value, in the prediction selection reference, of the sampling point of the basic prediction unit that is the sampling point Q, and then obtaining an absolute difference between a value of the sampling point of the basic prediction unit after filtering processing and a value of the sampling point of the basic prediction unit in the prediction selection reference after filtering processing, to obtain 1 prediction error of the basic prediction unit.

By performing the filtering processing, occurrence of an extreme value can be reduced, and accuracy of a prediction error can be improved.

When the basic prediction unit consists of one sampling point, in a specific calculation process, it may be considered that fineness of each motion partition is one sampling point, that is, each motion partition is as fine as a size of one sampling point. Therefore, the target area may be a rectangular picture block, or may be a contiguous or non-contiguous picture area in any shape. When fineness of a motion partition is one sampling point, motion information can accurately describe a boundary of a motion object, thereby improving video encoding and decoding performance.

Particularly, when the basic prediction unit consists of multiple sampling points, it may be separately obtaining absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit; and separately acquiring the sum of all absolute differences in each absolute-difference set in the N absolute-difference sets to obtain the N prediction errors of the basic prediction unit. Exemplarily, as shown in FIG. 7, for the basic prediction unit that is the area P consisting of the sampling points in the dotted-line box, it is first separately obtaining absolute differences between values of sampling points at same positions in the N predictions of the basic prediction unit and in the prediction selection reference of the basic prediction unit to obtain N absolute-difference sets, where each of the absolute-difference sets includes absolute differences of all sampling points of the basic prediction unit, that is, an absolute difference A1 between $Pred_1(0,2)$ and $Ref(0,2)$, an absolute difference B1 between $Pred_2(0,2)$ and $Ref(0,2)$, and an absolute difference C1 between $Pred_3(0,2)$ and $Ref(0,2)$, an absolute difference A2 between $Pred_1(1,2)$ and $Ref(1,2)$, an absolute difference B2 between $Pred_2(1,2)$ and $Ref(1,2)$, and an absolute difference C2 between $Pred_3(1,2)$ and $Ref(1,2)$, an absolute difference A3 between $Pred_1(0,3)$ and $Ref(0,3)$, an absolute difference B3 between $Pred_2(0,3)$ and $Ref(0,3)$, and an absolute difference C3 between $Pred_3(0,3)$ and $Ref(0,3)$, and an absolute difference A4 between $Pred_1(1,3)$ and $Ref(1,3)$, an absolute difference B4 between $Pred_2(1,3)$ and $Ref(1,3)$, and an absolute difference C4 between $Pred_3(1,3)$ and $Ref(1,3)$; the obtained N absolute-difference sets are separately (A1, A2, A3, A4), (B1, B2, B3, B4), and (C1, C2, C3, C4). Then it is separately acquiring the sum of all the absolute differences in each absolute-difference set in the 3 absolute-difference sets, that is, A1+A2+A3+A4, B1+B2+B3+B4, and C1+C2+C3+C4, to obtain the 3 prediction errors of the basic prediction unit. Alternatively, it may also be separately acquiring the sum of squares of all absolute differences in each absolute-difference set in the N absolute-difference sets to obtain the N prediction errors of the basic prediction unit, or separately acquiring high-order norms of all absolute differences in each absolute-difference set in the N absolute-difference sets to obtain the N prediction errors of the basic prediction unit. For a specific method, reference may be made to the foregoing embodiment, and details are not described herein again in the present disclosure.

When the basic prediction unit consists of multiple sampling points, in a specific calculation process, it may be considered that fineness of each motion partition is one basic prediction unit. Therefore, the target area may be a rectangular picture block, or may be a contiguous or non-contiguous picture area in any shape.

Figure 8:
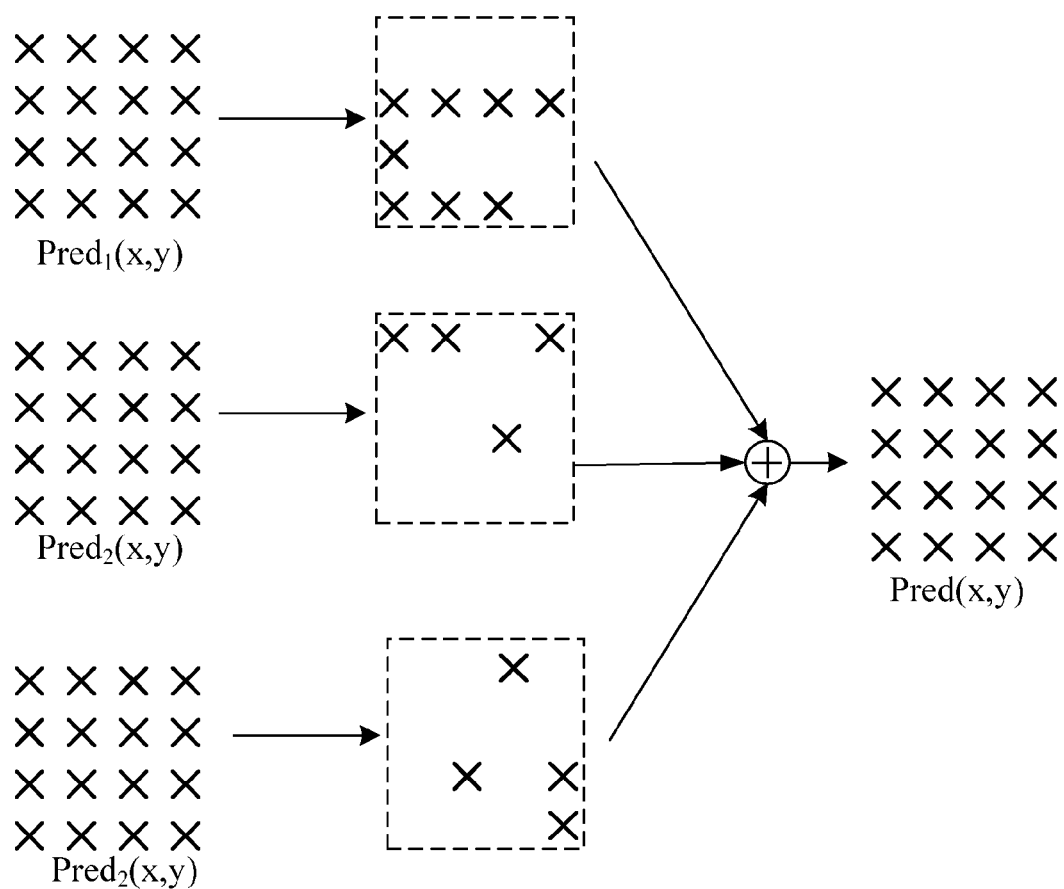
FIG. 8 is a schematic diagram of a method for acquiring a final prediction of a target area according to an embodiment of the present disclosure.

Because the target area consists of multiple basic prediction units, after the final prediction of the basic prediction unit is determined, the final prediction of the target area is determined accordingly. For example, when the basic prediction unit consists of one sampling point, after sampling points at same positions in the 3 predictions of the target area in FIG. 6 are compared with corresponding sampling points in the prediction selection reference, a result shown in FIG. 8 is obtained, where a prediction $Pred_1(x,y)$ has final predictions of 8 basic prediction units, which are separately values of sampling points at positions (0,0), (1,0), (2,0), (0,1), (0,2), (1,2), (2,2), and (3,2), a prediction $Pred_2(x,y)$ has final predictions of 4 basic prediction units, which are separately values of sampling points at positions (2,1), (0,3), (1,3), and (3,3), and a prediction $Pred_3(x,y)$ has final predictions of 4 basic prediction units, which are separately values of sampling points at positions (3,0), (1,1), (3,1), and (2,3). When the final predictions of the multiple basic prediction units of the target area are obtained, a final prediction $Pred(x,y)$ shown in FIG. 8 can be obtained through combination.

Figure 9:
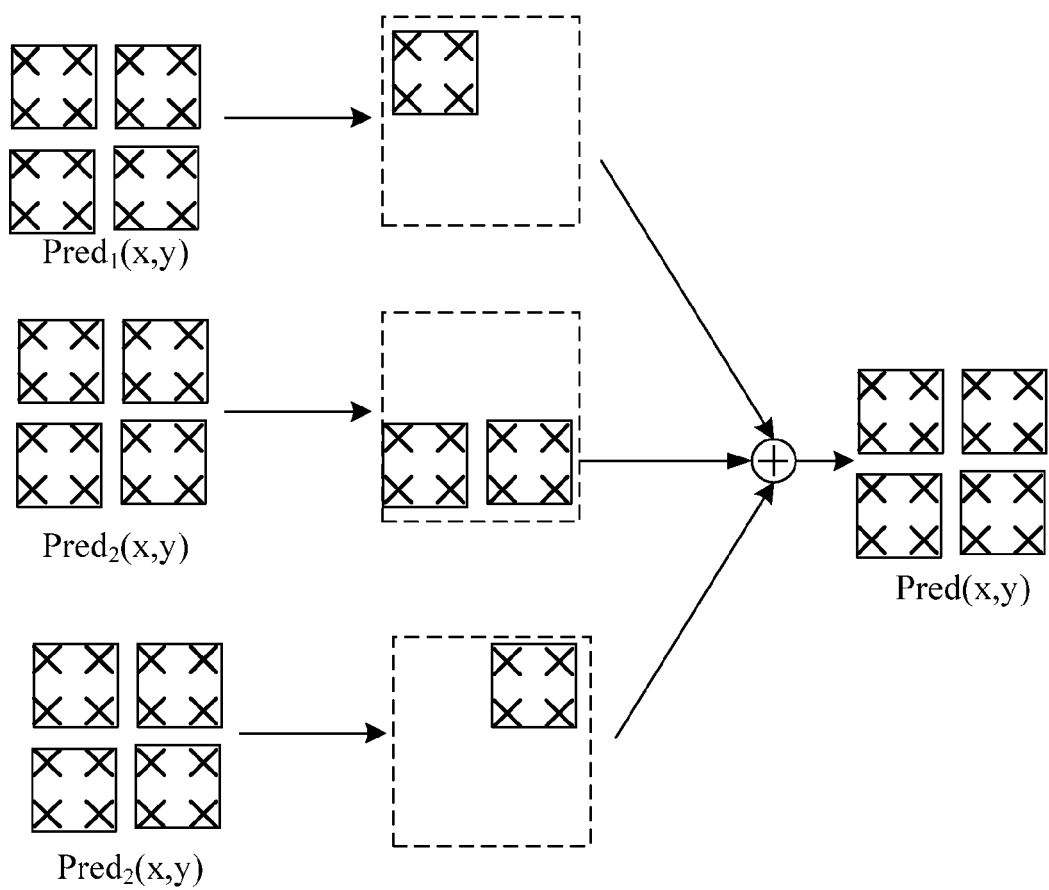
FIG. 9 is a schematic diagram of another method for acquiring a final prediction of a target area according to an embodiment of the present disclosure.

For another example, when the basic prediction unit consists of 2×2, that is, 4, sampling points in total, after 3 predictions of each basic prediction unit in the 3 predictions of the target area in FIG. 7 are compared with a prediction selection reference of the basic prediction unit, a result shown in FIG. 9 is obtained, where a prediction $Pred_1(x,y)$ has a final prediction of 1 basic prediction unit, that is, values of sampling points of a basic prediction unit at the upper left corner of the target area, a prediction $Pred_2(x,y)$ has final predictions of 2 basic prediction units, which are separately values of sampling points of basic prediction units at the lower left corner and the lower right corner of the target area, and a prediction $Pred_3(x,y)$ has a final prediction of 1 basic prediction unit, that is, values of sampling points of a basic prediction unit at the upper right corner of the target area. When the final predictions of the multiple basic prediction units of the target area are obtained, a final prediction $Pred(x,y)$ shown in FIG. 9 can be obtained through combination.

Particularly, the final prediction of the target area may also be determined by using a method in which a weighting factor is acquired. N weighting factors of the basic prediction unit may be first determined according to the N predictions of the basic prediction unit and the prediction selection reference of the basic prediction unit, where the weighting factors may be determined according to similarities between the predictions and prediction selection reference of the basic prediction unit, for example, N prediction errors of the basic prediction unit are calculated according to the N predictions of the basic prediction unit and the prediction selection reference of the basic prediction unit; and reciprocals of the N prediction errors of the basic prediction unit are separately obtained to obtain the N weighting factors of the basic prediction unit. Then, weighted averaging may be performed on the N predictions of the basic prediction unit by using the N weighting factors to obtain the final prediction of the basic prediction unit. For example, when N is 3, a prediction error between each prediction in the 3 predictions of the basic prediction unit and the prediction selection reference of the basic prediction unit is separately calculated, where $Error_M(x,y)=Ref(x,y)-P_M(x,y)$, and M=1 . . . 3, and reciprocals of obtained 3 prediction errors of each basic prediction unit are used as weighting factors. Particularly, the reciprocals of the 3 prediction errors of the basic prediction unit may be used as the weighting factors after normalization processing, that is, a weighting factor $W_M(x,y)=\text{Error}_M(x,y)^{-1}/\Sigma\text{Error}_M(x,y)^{-1}$. Next, weighted averaging is performed on the 3 predictions $P_M(x,y)$ of the basic prediction unit by using the obtained 3 weighting factors of the basic prediction unit, where M=1 . . . 3, to obtain a final prediction Pred(x,y) of the basic prediction unit, that is, $\text{Pred}(x,y)=W_1(x,y)*P_1(x,y)+W_2(x,y)*P_2(x,y)+W_3(x,y)*P_3(x,y)$. Because the final prediction of each basic prediction unit in the target area is determined, the final prediction of the target area is determined accordingly.

305: Reconstruct the target area according to the final prediction of the target area.

The reconstruction process may include multiple operations. For example, first, the final prediction Pred(x,y) may be subtracted from values of sampling points of the target area, to obtain original prediction errors; next, a reconstruction value may be obtained by performing operations on the original prediction errors, such as transformation, quantization, and scanning; then, a prediction error of the target area may be obtained by performing anti-scanning, dequantization, and inverse transformation processing based on the reconstruction value, and the target area is reconstructed based on the prediction error Resi(x,y) and the final prediction. Optionally, the prediction error Resi(x,y) and the final prediction Pred(x,y) may be superimposed, and a proper truncation operation is performed, to obtain a reconstruction Reco(x,y). Particularly, various loop filtering processing may be further performed on the reconstruction Reco(x,y).

The reconstructed target area is a part of a reconstructed target picture, and the reconstructed target picture may be stored in a reference picture list as a reference picture for subsequent picture processing.

306: Obtain N pieces of motion-related information according to the N pieces of motion information, and convert the N pieces of motion-related information into a binary string and write the binary string to a bitstream.

The encoder end needs to encode the N pieces of motion information. When the target picture has only one time domain reference picture, the motion information of the target area includes only a motion vector. Then the motion-related information is a motion vector. When a motion vector is directly encoded, the encoder end may convert N motion vectors into a binary string one by one, and write the binary strings to a bitstream, so that the decoder end acquires the bitstream, and decodes the target area according to the N pieces of motion-related information, that is, the motion vectors, in the bitstream. When differential coding is performed on a motion vector, the encoder end may separately perform a prediction encoding operation on each of multiple motion vectors to obtain motion vector prediction errors as motion-related information, and convert the motion vector prediction errors into a binary string and write the binary string to a bitstream, so that the decoder end acquires the bitstream, and decodes the target area according to the N pieces of motion-related information, that is, the motion vector prediction errors, in the bitstream.

For a process of generating the bitstream, reference may be made to the. The present disclosure merely gives an exemplary description, and sets no limitation thereto.

It should be noted that, after operations such as transformation, quantization, and scanning are performed on the original prediction errors to obtain the reconstruction value in step 305, the reconstruction value may be further converted into a binary symbol string and written to a bitstream, to be used by the decoder end to decode the target area.

It should be noted that, an order of the steps of the video encoding method provided in this embodiment of the present disclosure may be properly adjusted, a step may also be added or omitted according to a condition, and variations readily figured out by a person skilled in the art within the technical scope disclosed in the present disclosure shall fall within the protection scope of the present disclosure. Exemplarily, after step 3016, the obtained optimal prediction may be directly used as the final prediction, and step 305 and 306 are directly performed, which can reduce complexity of steps on the encoder end.

Figure 10:
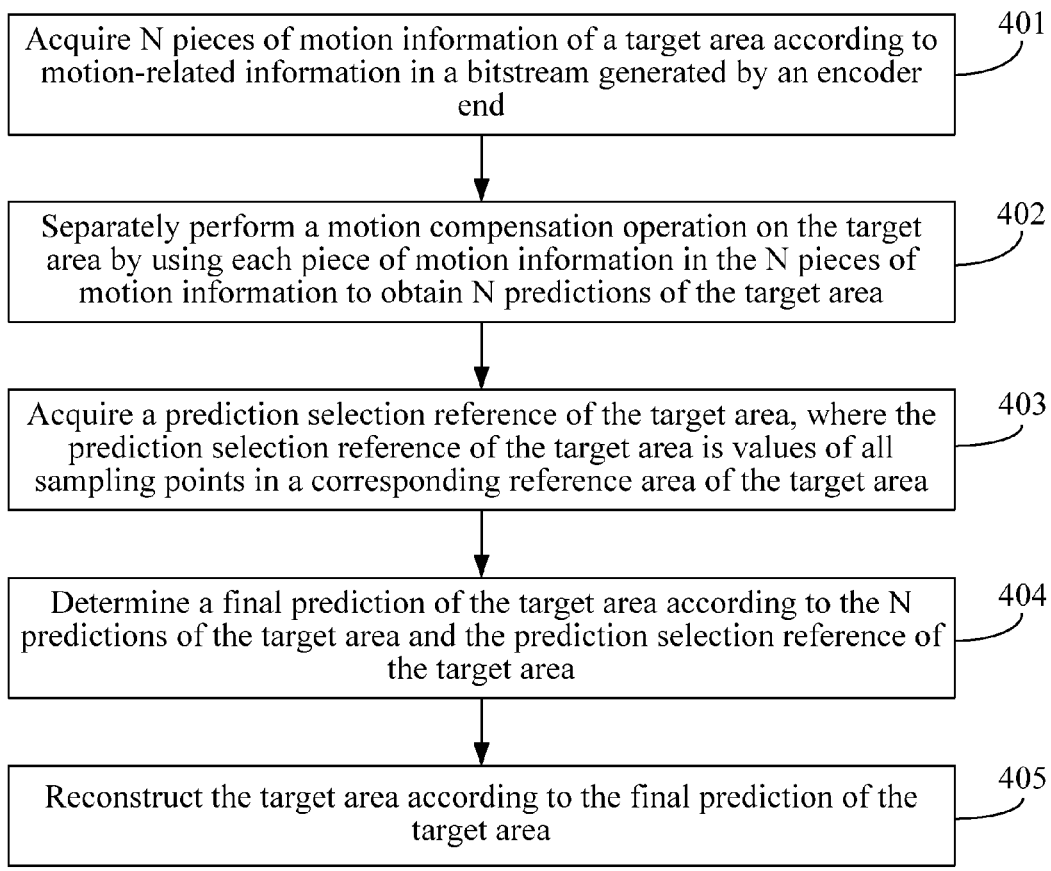
FIG. 10 is a flowchart of another video decoding method according to an embodiment of the present disclosure.

Correspondingly, for the same target area, that is, the target area is a 4×4 picture block, an embodiment of the present disclosure provides another video decoding method, applied to a decoder end. As shown in FIG. 10, the method includes 401: Acquire N pieces of motion information of a target area according to motion-related information in a bitstream generated by an encoder end.

It should be noted that, the target area may consist of M basic prediction units, where M is greater than or equal to 2. N is an integer greater than or equal to 2, and N may be a preset number. A specific quantity N of pieces of the motion information may be preset on both the encoder and decoder ends; or may be randomly set on the encoder end, and the specific quantity N is transmitted to the decoder end.

When a target picture has only one time domain reference picture, the motion information of the target area therein includes only a motion vector. When a motion vector is directly encoded, the decoder end may directly acquire the motion-related information, that is, N motion vectors, from the bitstream, and directly use the N motion vectors as the N pieces of motion information of the target area. When differential coding is performed on a motion vector, the decoder end may acquire the motion-related information, that is, N motion vector differences, from the bitstream, obtain N motion vector predictions through deduction with reference to a given rule, finally superimpose the motion vector differences and the motion vector predictions to determine N motion vectors, and use the N motion vectors as the N pieces of motion information. The method for acquiring the motion information from the bitstream is merely for exemplary description, which is not limited in the present disclosure.

402: Separately perform a motion compensation operation on the target area by using each piece of motion information in the N pieces of motion information to obtain N predictions of the target area.

Each prediction of the target area in the N predictions of the target area includes predicted values of all sampling points in the target area.

In practical application, the performing a motion compensation operation on the target area by using each piece of motion information in the N pieces of motion information to obtain N predictions of the target area is obtaining a corresponding prediction of the target area according to each piece of motion information, where there are multiple existing methods for obtaining a prediction of a target area according to a given piece of motion information, and for a method used in this embodiment of the present disclosure, reference may be made to any one of the methods for obtaining a prediction of a target area.

Exemplarily, it is assumed that motion information s is any piece of motion information in the N pieces of motion information. When the motion information s is used to perform a motion compensation operation on the target area to obtain a corresponding prediction of the target area, if the motion information s indicates a unidirectional prediction operation, one matching area may be determined according to the motion information s; if the motion information s indicates a bidirectional prediction operation, two matching areas may be determined according to the motion information s. When one matching area is obtained, values of sampling points of the matching area, that is, sampling values, may be used as a prediction of the target area after proper processing; or values of sampling points of the matching area may be directly used as a prediction of the target area. When two matching areas are obtained, values of sampling points of the two matching areas may be used as a prediction of the target area after weighted averaging or another processing operation.

Because the target area in this embodiment of the present disclosure is a 4×4 picture block, the N predictions obtained by performing the motion compensation operation on the target area by using each piece of motion information in the N pieces of motion information may also be those shown in FIG. 5, where the N predictions are separately $Pred_1(x,y)$ to $Pred_N(x,y)$, where $Pred_1(x,y)$ is a predicted value of a sampling point at a coordinate position (x,y) in a coordinate system built in a width direction and a height direction of a two-dimensional sampling point array of the target area, x=0 . . . 3, and y=0 . . . 3. A symbol "x" in FIG. 5 represents one sampling point, that is, one pixel. Because the target area consists of multiple basic prediction units, after the N predictions of the target area are determined, correspondingly, N predictions of each basic prediction unit are determined accordingly. As shown in FIG. 5, if the basic prediction unit consists of one sampling point, assuming that a coordinate position of a sampling point U is (0,3) in the coordinate system built in the width direction and the height direction of the two-dimensional sampling point array of the target area, N predictions of the sampling point U are separately $Pred_1(0,3)$ to $Pred_N(0,3)$. If the basic prediction unit consists of 2×2, that is, 4, sampling points in total, N predictions of the basic prediction unit V are separately values of sampling points of the basic prediction unit at the lower right corner of the target area, for example, the first prediction of the basic prediction unit V may be values of the sampling points, that is, $Pred_1(2,0)$, $Pred_1(2,1)$, $Pred_1(3,0)$, and $Pred_1(3,1)$.

403: Acquire a prediction selection reference of the target area, where the prediction selection reference of the target area is values of all sampling points in a corresponding reference area of the target area.

The prediction selection reference of the target area refers to values of all sampling points in a reference area of the target area. Exemplarily, the prediction selection reference of the target area may be represented by using Ref(x,y), where x and y describe a position of a sampling point in the reference area of the target area, and Ref(x,y) represents a value of a sampling point at a coordinate position (x,y). The reference area of the target area is a picture area corresponding to the target area, and is a picture block matching the target area in terms of a content feature. In the case of scalable video coding or decoding, the reference area may be a picture area, having a spatial correspondence with the target area, in areas in a picture that is at a lower layer relative to a target picture. When the target picture and the lower-layer picture of the target picture have a same resolution, the correspondence may be that the target area and an area in the lower-layer picture have same position coordinates in their respective pictures. When the target picture and the lower-layer picture of the target picture have different resolutions, the correspondence may be considered as that when the two pictures have a same resolution after being scaled properly, the target area and the area in the lower-layer picture have same position coordinates in their respective pictures. In the case of single-layer coding or decoding, the reference area may be an area in a reference picture of a target picture. Generally, a picture content texture feature and motion feature in the reference area both have an extremely high similarity with a picture content texture feature and motion feature in the target area.

Because the reference area of the target area may also be considered to consist of multiple basic prediction units, in this embodiment of the present disclosure, after the prediction selection reference of the target area is acquired, correspondingly, a prediction selection reference of a basic prediction unit can be obtained.

404: Determine a final prediction of the target area according to the N predictions of the target area and the prediction selection reference of the target area.

Exemplarily, a final prediction of the basic prediction unit may be determined according to the N predictions of the basic prediction unit and the prediction selection reference of the basic prediction unit.

Further, that a final prediction of the basic prediction unit may be determined according to the N predictions of the basic prediction unit and the prediction selection reference of the basic prediction unit may include calculating N prediction errors of the basic prediction unit according to the N predictions of the basic prediction unit and the prediction selection reference of the basic prediction unit; and comparing the N prediction errors of the basic prediction unit, and acquiring a prediction, corresponding to a minimum prediction error, of the basic prediction unit as the final prediction of the basic prediction unit.

It should be noted that, basic prediction units in the "prediction selection reference of the basic prediction unit" and the "N predictions of the basic prediction unit" in the present disclosure are located at a same position, and have a spatial correlation. It is assumed that the prediction selection reference of the target area is represented by Ref(x,y), N is 3, and the N predictions of the target area are separately Pred1(x,y) to Pred3(x,y). Errors between the 3 predictions of the basic prediction unit and the prediction selection reference of the basic prediction unit are separately obtained to obtain 3 prediction errors of the basic prediction unit. When the basic prediction unit consists of one sampling point, exemplarily, the 3 predictions of the basic prediction unit and the prediction selection reference of the basic prediction unit may be those shown in FIG. 6. For example, a basic prediction unit is a sampling point Q; assuming that a coordinate position of the sampling point Q is (0,3) in the coordinate system built in the width direction and the height direction of the two-dimensional sampling point array of the target area, 3 predictions of the basic prediction unit are separately Pred1(0,3), Pred2(0,3), and Pred3(0,3), and a prediction selection reference of the basic prediction unit is Ref(0,3).

When the basic prediction unit consists of multiple sampling points, exemplarily, the 3 predictions of the basic prediction unit and the prediction selection reference of the basic prediction unit may be those shown in FIG. 7. It is assumed that the basic prediction unit consists of 2×2, that is, 4, sampling points in total, like a unit consisting of sampling points in a solid-line box in FIG. 7, for example, a basic prediction unit is an area P consisting of sampling points in a dotted-line box. Then, 3 predictions of the basic prediction unit are separately values of the sampling points in the area P at the upper left corner of the target area, for example, the first prediction of the basic prediction unit may be values of the sampling points, that is, Pred1(0,2), Pred1(1,2), Pred1(0,3), and Pred1(1,3). A prediction selection reference of the basic prediction unit is values of the sampling points, that is, Ref(0,2), Ref(1,2), Ref(0,3), and Ref(1,3).

In this embodiment of the present disclosure, the basic prediction unit may consist of one or more sampling points, where the "multiple" is at least two. Because the basic prediction unit may consist of different quantities of sampling points, correspondingly, methods for obtaining the N prediction errors of the basic prediction unit are also different.

Exemplarily, when the basic prediction unit consists of one sampling point, it may be separately obtaining absolute differences between values of the sampling point in the N predictions of the basic prediction unit and a value of the sampling point in the prediction selection reference of the basic prediction unit to obtain the N prediction errors of the basic prediction unit. For example, as shown in FIG. 6, for the basic prediction unit that is the sampling point Q, it may be separately obtaining an absolute difference between Pred1(0,3) and Ref(0,3), an absolute difference between Pred2(0,3) and Ref(0,3), and an absolute difference between Pred3(0,3) and Ref(0,3) as the 3 prediction errors of the basic prediction unit.

Alternatively, it may be separately obtaining squares of differences between values of the sampling point in the N predictions of the basic prediction unit and a value of the sampling point in the prediction selection reference of the basic prediction unit to obtain the N prediction errors of the basic prediction unit. For example, as shown in FIG. 6, for the basic prediction unit that is the sampling point Q, it may be separately obtaining a square of a difference between Pred1(0,3) and Ref(0,3), a square of a difference between Pred2(0,3) and Ref(0,3), and a square of a difference between Pred3(0,3) and Ref(0,3) as the 3 prediction errors of the basic prediction unit.

When the basic prediction unit consists of one sampling point, it may also be separately obtaining differences between values of the sampling point in the N predictions of the basic prediction unit and a value of the sampling point in the prediction selection reference of the basic prediction unit, performing filtering processing on each of the differences, and obtaining absolute values, to obtain the N prediction errors of the basic prediction unit. That is, it may be performing filtering processing to determine a difference of the sampling point at a position (x,y) with the help of differences of sampling points at neighboring positions, such as (x,y−1), (x−1,y), (x+1,y), and (x,y+1), of the sampling point at the position (x,y), and then obtaining an absolute value of the difference. For example, as shown in FIG. 6, for the basic prediction unit that is the sampling point Q, it may be separately obtaining a difference between Pred1(0,3) and Ref(0,3), a difference between Pred2(0,3) and Ref(0,3), and a difference between Pred3(0,3) and Ref(0,3), and then performing filtering processing on the 3 differences. It should be noted that, when the 3 differences are obtained, differences of another basic prediction unit in the target area are also obtained correspondingly, and an obtaining method is the same as a difference obtaining method when the basic prediction unit is the sampling point Q; in this way, only after differences of all the basic prediction units in the target area are obtained, filtering processing can be performed and absolute values can be obtained to obtain 3 prediction errors of each basic prediction unit, for example, when filtering processing is performed on the difference between Pred1(0,3) and Ref(0,3) and an absolute value is obtained, differences of sampling points at neighboring positions (0,2) and (1,3) of the position (0,3) of the sampling point Q, which are separately a difference between Pred1(0,2) and Ref(0,3) and a difference between Pred1(1,3) and Ref(0,3), may be obtained; then, with the help of the two differences and according to a preset criteria, a difference of the basic prediction unit that is the sampling point Q after the filtering is determined, and an absolute value of the difference after the filtering is obtained to obtain 1 prediction error of the basic prediction unit that is the sampling point Q.

Alternatively, it may be separately performing filtering processing on values of the sampling point in the N predictions of the basic prediction unit, performing filtering processing on a value of the sampling point in the prediction selection reference of the basic prediction unit, and separately obtaining absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit. For example, as shown in FIG. 6, for the basic prediction unit that is the sampling point Q, it may be separately acquiring values of sampling points at neighboring positions (0,2) and (1,3) of the position (0,3) of the sampling point Q in the target area, then determining, with the help of the values of the two sampling points and according to a preset criteria, a value of the sampling point of the basic prediction unit that is the sampling point Q, then separately acquiring values, in the prediction selection reference of the target area, of the sampling points at the neighboring positions (0,2) and (1,3) of the position (0,3) of the sampling point Q, then determining, with the help of the values of the two sampling points and according to a preset criteria, a value, in the prediction selection reference, of the sampling point of the basic prediction unit that is the sampling point Q, and then obtaining an absolute difference between a value of the sampling point of the basic prediction unit after filtering processing and a value of the sampling point of the basic prediction unit in the prediction selection reference after filtering processing, to obtain 1 prediction error of the basic prediction unit.

By performing the filtering processing, occurrence of an extreme value can be reduced, and accuracy of a prediction error can be improved.

When the basic prediction unit consists of one sampling point, in a specific calculation process, it may be considered that fineness of each motion partition is one sampling point. Therefore, the target area may be a rectangular picture block, or may be a contiguous or non-contiguous picture area in any shape. When fineness of a motion partition is one sampling point, motion information can accurately describe a boundary of a motion object, thereby improving video encoding and decoding performance.

Particularly, when the basic prediction unit consists of multiple sampling points, it may be separately obtaining absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit; and separately acquiring the sum of all absolute differences in each absolute-difference set in the N absolute-difference sets to obtain the N prediction errors of the basic prediction unit. Exemplarily, as shown in FIG. 7, for the basic prediction unit that is the area P consisting of the sampling points in the dotted-line box, it is first separately obtaining absolute differences between values of sampling points at same positions in the N predictions of the basic prediction unit and in the prediction selection reference of the basic prediction unit to obtain N absolute-difference sets, where each of the absolute-difference sets includes absolute differences of all sampling points of the basic prediction unit, that is, an absolute difference A1 between Pred1(0,2) and Ref(0,2), an absolute difference B1 between Pred2(0,2) and Ref(0,2), and an absolute difference C1 between Pred3 (0,2) and Ref(0,2), an absolute difference A2 between Pred1 (1,2) and Ref(1,2), an absolute difference B2 between Pred2 (1,2) and Ref(1,2), and an absolute difference C2 between Pred3(1,2) and Ref(1,2), an absolute difference A3 between Pred1(0,3) and Ref(0,3), an absolute difference B3 between Pred2(0,3) and Ref(0,3), and an absolute difference C3 between Pred3(0,3) and Ref(0,3), and an absolute difference A4 between Pred1(1,3) and Ref(1,3), an absolute difference B4 between Pred2 (1,3) and Ref(1,3), and an absolute difference C4 between Pred3(1,3) and Ref(1,3); the obtained N absolute-difference sets are separately (A1, A2, A3, A4), (B1, B2, B3, B4), and (C1, C2, C3, C4). Then it is separately acquiring the sum of all the absolute differences in each absolute-difference set in the 3 absolute-difference sets, that is, A1+A2+A3+A4, B1+B2+B3+B4, and C1+C2+C3+C4, to obtain the 3 prediction errors of the basic prediction unit. Alternatively, it may also be separately acquiring the sum of squares of all absolute differences in each absolute-difference set in the N absolute-difference sets to obtain the N prediction errors of the basic prediction unit, or separately acquiring high-order norms of all absolute differences in each absolute-difference set in the N absolute-difference sets to obtain the N prediction errors of the basic prediction unit. For a specific method, reference may be made to the foregoing embodiment, and details are not described herein again in the present disclosure.

When the basic prediction unit consists of multiple sampling points, in a specific calculation process, it may be considered that fineness of each motion partition is one basic prediction unit. Therefore, the target area may be a rectangular picture block, or may be a contiguous or non-contiguous picture area in any shape.

Because the target area consists of multiple basic prediction units, after the final prediction of the basic prediction unit is determined, the final prediction of the target area is determined accordingly. For example, when the basic prediction unit consists of one sampling point, after sampling points at same positions in the 3 predictions of the target area in FIG. 6 are compared with corresponding sampling points in the prediction selection reference, a result shown in FIG. 8 is obtained, where a prediction Pred1(x,y) has final predictions of 8 basic prediction units, which are separately values of sampling points at positions (0,0), (1,0), (2,0), (0,1), (0,2), (1,2), (2,2), and (3,2), a prediction Pred2(x,y) has final predictions of 4 basic prediction units, which are separately values of sampling points at positions (2,1), (0,3), (1,3), and (3,3), and a prediction Pred3(x,y) has final predictions of 4 basic prediction units, which are separately values of sampling points at positions (3,0), (1,1), (3,1), and (2,3). When the final predictions of the multiple basic prediction units of the target area are obtained, a final prediction Pred(x,y) shown in FIG. 8 can be obtained through combination.

For another example, when the basic prediction unit consists of 2×2, that is, 4, sampling points in total, after 3 predictions of each basic prediction unit in the 3 predictions of the target area in FIG. 7 are compared with a prediction selection reference of the basic prediction unit, a result shown in FIG. 9 is obtained, where a prediction Pred1(x,y) has a final prediction of 1 basic prediction unit, that is, values of sampling points of a basic prediction unit at the upper left corner of the target area, a prediction Pred2(x,y) has final predictions of 2 basic prediction units, which are separately values of sampling points of basic prediction units at the lower left corner and the lower right corner of the target area, and a prediction Pred3(x,y) has a final prediction of 1 basic prediction unit, that is, values of sampling points of a basic prediction unit at the upper right corner of the target area. When the final predictions of the multiple basic prediction units of the target area are obtained, a final prediction Pred(x,y) shown in FIG. 9 can be obtained through combination.

Particularly, the final prediction of the target area may also be determined by using a method in which a weighting factor is acquired. N weighting factors of the basic prediction unit may be first determined according to the N predictions of the basic prediction unit and the prediction selection reference of the basic prediction unit, where the weighting factors may be determined according to similarities between the predictions and prediction selection reference of the basic prediction unit, for example, N prediction errors of the basic prediction unit are calculated according to the N predictions of the basic prediction unit and the prediction selection reference of the basic prediction unit; and reciprocals of the N prediction errors of the basic prediction unit are separately obtained to obtain the N weighting factors of the basic prediction unit. Then, weighted averaging may be performed on the N predictions of the basic prediction unit by using the N weighting factors to obtain the final prediction of the basic prediction unit. For example, when N is 3, a prediction error between each prediction in the 3 predictions of the basic prediction unit and the prediction selection reference of the basic prediction unit is separately calculated, where $ErrorM(x,y)=Ref(x,y)-PM(x,y)$, and $M=1 \ldots 3$, and reciprocals of obtained 3 prediction errors of each basic prediction unit are used as weighting factors. Particularly, the reciprocals of the 3 prediction errors of the basic prediction unit may be used as the weighting factors after normalization processing, that is, a weighting factor $WM(x,y)=ErrorM(x,y)-1/\Sigma ErrorM(x,y)-1$. Next, weighted averaging is performed on the 3 predictions $PM(x,y)$ of the basic prediction unit by using the obtained 3 weighting factors of the basic prediction unit, where $M=1 \ldots 3$, to obtain a final prediction $Pred(x,y)$ of the basic prediction unit, that is, $Pred(x,y)=W1(x,y)*P1(x,y)+W2(x,y)*P2(x,y)+W3(x,y)*P3(x,y)$. Because the final prediction of each basic prediction unit in the target area is determined, the final prediction of the target area is determined accordingly.

405: Reconstruct the target area according to the final prediction of the target area.

The decoder end may acquire prediction error information of the target area from the bitstream, and determine a prediction error Resi(x,y) of the target area based on the acquired prediction error information. The prediction error information of the target area may be a binary symbol string converted from a reconstruction value obtained by the encoder end by performing operations on original prediction errors, such as transformation, quantization, and scanning. The acquiring prediction error information of the target area from the bitstream may be acquiring the binary symbol string from a binary bitstream. The determining a prediction error of the target area based on the acquired prediction error information may be obtaining the reconstruction value by converting the binary symbol string, and obtaining the prediction error of the target area by performing anti-scanning, dequantization, and inverse transformation processing on the reconstruction value. If the bitstream has no prediction error information, the operation of determining the prediction error does not need to be performed.

Optionally, the prediction error Resi(x,y) and the final prediction Pred(x,y) may be superimposed, and a proper truncation operation is performed, to obtain a reconstruction Reco(x,y). If no prediction error exists, the final prediction may be directly used as the reconstruction of the target area. Particularly, various loop filtering processing may be further performed on the reconstruction Reco(x,y).

It should be noted that, an order of the steps of the video decoding method provided in this embodiment of the present disclosure may be properly adjusted, a step may also be added or omitted according to a condition, and variations readily figured out by a person skilled in the art within the technical scope disclosed in the present disclosure shall fall within the protection scope of the present disclosure. Therefore, details are not further described herein.

In the video encoding and decoding methods provided in the embodiments of the present disclosure, a preset quantity of pieces of motion information exist for one target area, and a final prediction of the target area is determined according to predictions obtained according to the preset quantity of pieces of motion information and a prediction selection reference. As compared with the, picture partition does not need to be performed; moreover, multiple predictions obtained according to descriptions that are of one same target area and indicated by multiple pieces of motion information are more accurate, and the final prediction of the target area determined according to the multiple predictions and the prediction selection reference has higher accuracy. Therefore, video decoding performance can be enhanced, and decoding precision can be improved.

Figure 11:
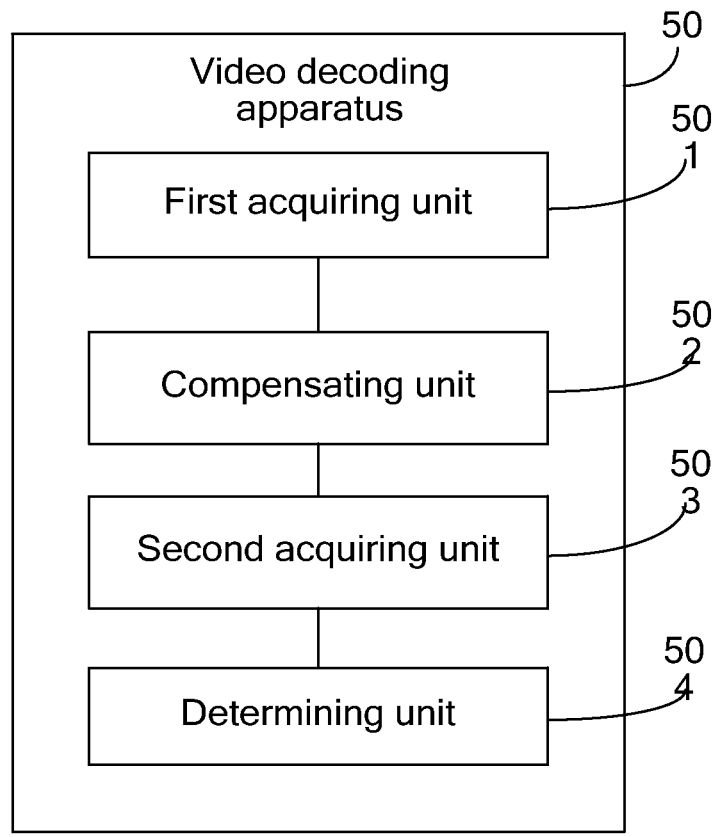
FIG. 11 is a schematic structural diagram of a video decoding apparatus according to an embodiment of the present disclosure.

An embodiment of the present disclosure provides a video decoding apparatus 50. As shown in FIG. 11, the apparatus includes a first acquiring unit 501 configured to acquire N pieces of motion information of a target area according to motion-related information in a bitstream generated by an encoder end, where N is an integer greater than or equal to 2, and the target area consists of M basic prediction units, where M is greater than or equal to 2, a compensating unit 502 configured to separately perform a motion compensation operation on the target area by using each piece of motion information in the N pieces of motion information to obtain N predictions of the target area, where each prediction in the N predictions of the target area includes predicted values of all sampling points in the target area, a second acquiring unit 503 configured to acquire a prediction selection reference of the target area, where the prediction selection reference of the target area is values of all sampling points in a corresponding reference area of the target area, and a determining unit 504 configured to determine a final prediction of the target area according to the N predictions of the target area and the prediction selection reference of the target area.

In this way, the first acquiring unit acquires a preset quantity of pieces of motion information for one target area, and the determining unit determines a final prediction of the target area according to predictions obtained by the compensating unit according to the preset quantity of pieces of motion information and a prediction selection reference acquired by the second acquiring unit. As compared with the, picture partition does not need to be performed; moreover, multiple predictions obtained according to descriptions that are of one same target area and indicated by multiple pieces of motion information are more accurate, and the final prediction of the target area determined according to the multiple predictions and the prediction selection reference has higher accuracy. Therefore, video decoding performance can be enhanced, and decoding precision can be improved.

Further, the determining unit 504 is configured to determine a final prediction of the basic prediction unit according to N predictions of the basic prediction unit and a prediction selection reference of the basic prediction unit, where each prediction in the N predictions of the basic prediction unit consists of predicted values of all sampling points in the basic prediction unit, and the prediction selection reference of the basic prediction unit is values of all sampling points of a reference area corresponding to the basic prediction unit.

Figure 12:
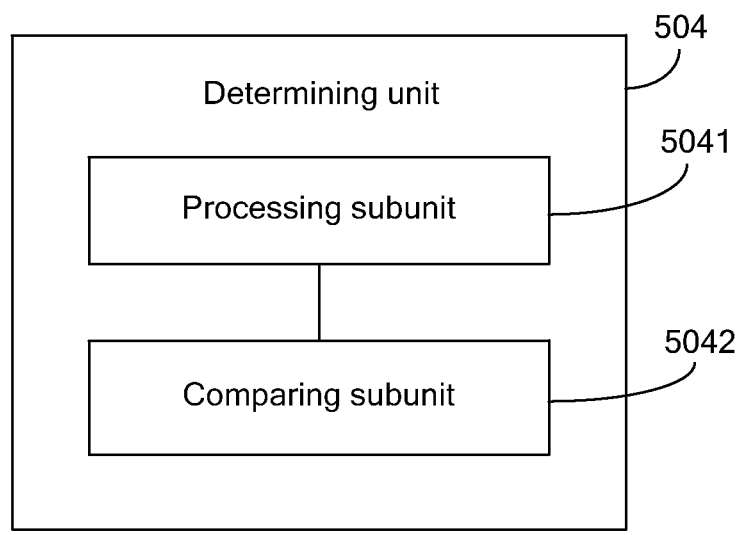
FIG. 12 is a schematic structural diagram of a determining unit of the video decoding apparatus according to the embodiment of the present disclosure.

As shown in FIG. 12, the determining unit 504 includes a processing subunit 5041 configured to calculate N prediction errors of the basic prediction unit according to the N predictions of the basic prediction unit and the prediction selection reference of the basic prediction unit, and a comparing subunit 5042 configured to compare the N prediction errors of the basic prediction unit, and acquire a prediction, corresponding to a minimum prediction error, of the basic prediction unit as the final prediction of the basic prediction unit.

Figure 13:
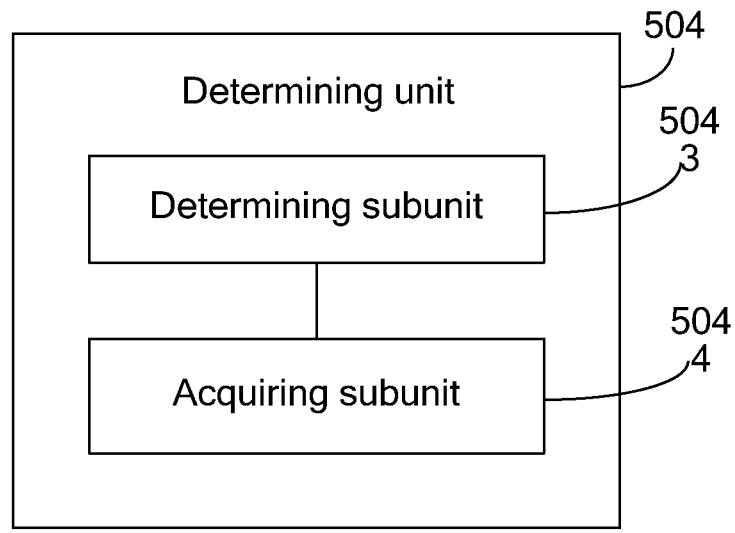
FIG. 13 is a schematic structural diagram of another determining unit of the video decoding apparatus according to the embodiment of the present disclosure.

Further, as shown in FIG. 13, the determining unit 504 may further include a determining subunit 5043 configured to determine N weighting factors of the basic prediction unit according to the N predictions of the basic prediction unit and the prediction selection reference of the basic prediction unit, where the determining subunit 5043 is configured to: calculate N prediction errors of the basic prediction unit according to the N predictions of the basic prediction unit and the prediction selection reference of the basic prediction unit; and separately obtain reciprocals of the N prediction errors of the basic prediction unit to obtain the N weighting factors of the basic prediction unit, and an acquiring subunit 5044 configured to perform weighted averaging on the N predictions of the basic prediction unit by using the N weighting factors to obtain the final prediction of the basic prediction unit.

Particularly, the basic prediction unit consists of one or more sampling points. When the basic prediction unit consists of one sampling point, the processing subunit 5041 is configured to separately obtain absolute differences between values of the sampling point in the N predictions of the basic prediction unit and a value of the sampling point in the prediction selection reference of the basic prediction unit to obtain the N prediction errors of the basic prediction unit; or separately obtain squares of differences between values of the sampling point in the N predictions of the basic prediction unit and a value of the sampling point in the prediction selection reference of the basic prediction unit to obtain the N prediction errors of the basic prediction unit, or the determining subunit 5043 may be configured to: separately obtain absolute differences between values of the sampling point in the N predictions of the basic prediction unit and a value of the sampling point in the prediction selection reference of the basic prediction unit to obtain the N prediction errors of the basic prediction unit; or separately obtain squares of differences between values of the sampling point in the N predictions of the basic prediction unit and a value of the sampling point in the prediction selection reference of the basic prediction unit to obtain the N prediction errors of the basic prediction unit.

When the basic prediction unit consists of one sampling point, the processing subunit 5041 is configured to separately obtain differences between values of the sampling point in the N predictions of the basic prediction unit and a value of the sampling point in the prediction selection reference of the basic prediction unit, perform filtering processing on each of the differences, and obtain absolute values, to obtain the N prediction errors of the basic prediction unit; or separately perform filtering processing on values of the sampling point in the N predictions of the basic prediction unit, perform filtering processing on a value of the sampling point in the prediction selection reference of the basic prediction unit, and separately obtain absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit, or the determining subunit 5043 may be configured to: separately obtain differences between values of the sampling point in the N predictions of the basic prediction unit and a value of the sampling point in the prediction selection reference of the basic prediction unit, perform filtering processing on each of the differences, and obtain absolute values, to obtain the N prediction errors of the basic prediction unit; or separately perform filtering processing on values of the sampling point in the N predictions of the basic prediction unit, perform filtering processing on a value of the sampling point in the prediction selection reference of the basic prediction unit, and separately obtain absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

When the basic prediction unit consists of multiple sampling points, the processing subunit 5041 is configured to separately obtain absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit; and separately acquire the sum of all absolute differences in each absolute-difference set in the N absolute-difference sets to obtain the N prediction errors of the basic prediction unit; or separately acquire the sum of squares of all absolute differences in each absolute-difference set in the N absolute-difference sets to obtain the N prediction errors of the basic prediction unit; or separately acquire high-order norms of all absolute differences in each absolute-difference set in the N absolute-difference sets to obtain the N prediction errors of the basic prediction unit, or the determining subunit 5043 may be configured to: separately obtain absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit; and separately acquire the sum of all absolute differences in each absolute-difference set in the N absolute-difference sets to obtain the N prediction errors of the basic prediction unit; or separately acquire the sum of squares of all absolute differences in each absolute-difference set in the N absolute-difference sets to obtain the N prediction errors of the basic prediction unit; or separately acquire high-order norms of all absolute differences in each absolute-difference set in the N absolute-difference sets to obtain the N prediction errors of the basic prediction unit.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the video decoding apparatus provide in this embodiment of the present disclosure, the first acquiring unit acquires a preset quantity of pieces of motion information for one target area, and the determining unit determines a final prediction of the target area according to predictions obtained by the compensating unit according to the preset quantity of pieces of motion information and a prediction selection reference acquired by the second acquiring unit. As compared with the, picture partition does not need to be performed; moreover, multiple predictions obtained according to descriptions that are of one same target area and indicated by multiple pieces of motion information are more accurate, and the final prediction of the target area determined according to the multiple predictions and the prediction selection reference has higher accuracy. Therefore, video encoding and decoding performance can be enhanced, and decoding precision can be improved.

Figure 14:
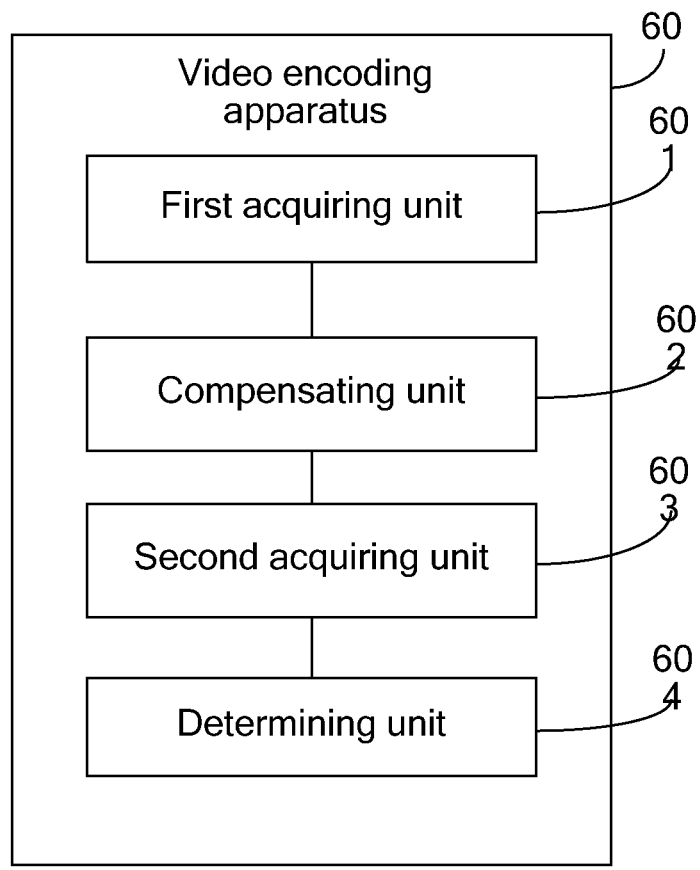
FIG. 14 is a schematic structural diagram of a video encoding apparatus according to an embodiment of the present disclosure.

An embodiment of the present disclosure provides a video encoding apparatus 60. As shown in FIG. 14, the apparatus includes a first acquiring unit 601 configured to determine N pieces of motion information of a target area, where N is an integer greater than or equal to 2, and the target area consists of M basic prediction units, where M is greater than or equal to 2, a compensating unit 602 configured to separately perform a motion compensation operation on the target area by using each piece of motion information in the N pieces of motion information to obtain N predictions of the target area, where each prediction in the N predictions of the target area includes predicted values of all sampling points in the target area, a second acquiring unit 603 configured to acquire a prediction selection reference of the target area, where the prediction selection reference of the target area is values of all sampling points in a corresponding reference area of the target area, and a determining unit 604 configured to determine a final prediction of the target area according to the N predictions of the target area and the prediction selection reference of the target area.

In this way, the first acquiring unit acquires a preset quantity of pieces of motion information for one target area, and the determining unit determines a final prediction of the target area according to predictions obtained by the compensating unit according to the preset quantity of pieces of motion information and a prediction selection reference acquired by the second acquiring unit. As compared with the, picture partition does not need to be performed; moreover, multiple predictions obtained according to descriptions that are of one same target area and indicated by multiple pieces of motion information are more accurate, and the final prediction of the target area determined according to the multiple predictions and the prediction selection reference has higher accuracy. Therefore, video encoding performance can be enhanced, and decoding precision can be improved.

Further, the determining unit 604 is configured to determine a final prediction of the basic prediction unit according to N predictions of the basic prediction unit and a prediction selection reference of the basic prediction unit.

Figure 15:
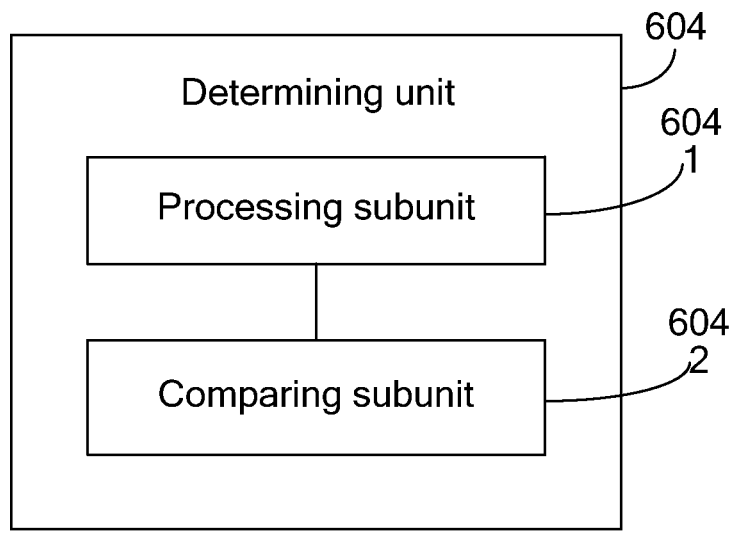
FIG. 15 is a schematic structural diagram of a determining unit of the video encoding apparatus according to the embodiment of the present disclosure.

As shown in FIG. 15, the determining unit 604 includes a processing subunit 6041 configured to calculate N prediction errors of the basic prediction unit according to the N predictions of the basic prediction unit and the prediction selection reference of the basic prediction unit, and a comparing subunit 6042 configured to compare the N prediction errors of the basic prediction unit, and acquire a prediction, corresponding to a minimum prediction error, of the basic prediction unit as the final prediction of the basic prediction unit.

Figure 16:
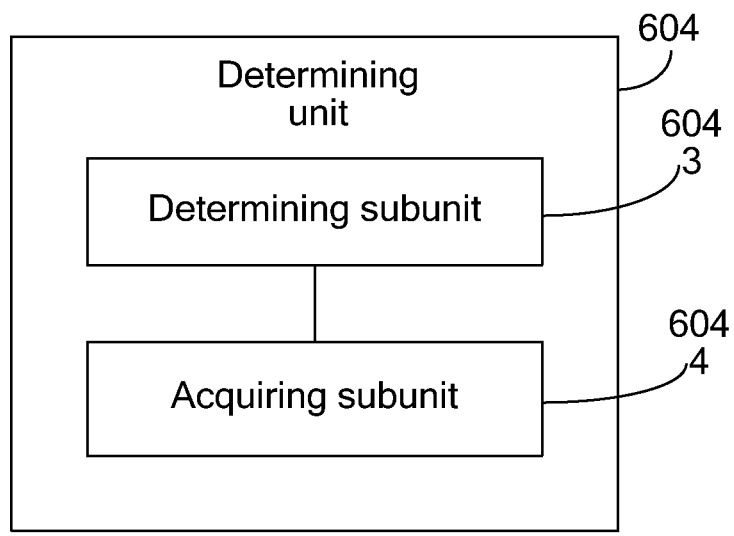
FIG. 16 is a schematic structural diagram of another determining unit of the video encoding apparatus according to the embodiment of the present disclosure.

Further, as shown in FIG. 16, the determining unit 604 may further include a determining subunit 6043 configured to determine N weighting factors of the basic prediction unit according to the N predictions of the basic prediction unit and the prediction selection reference of the basic prediction unit, where the determining subunit 6043 is configured to: calculate N prediction errors of the basic prediction unit according to the N predictions of the basic prediction unit and the prediction selection reference of the basic prediction unit; and separately obtain reciprocals of the N prediction errors of the basic prediction unit to obtain the N weighting factors of the basic prediction unit, and an acquiring subunit 6044 configured to perform weighted averaging on the N predictions of the basic prediction unit by using the N weighting factors to obtain the final prediction of the basic prediction unit.

The basic prediction unit consists of one or more sampling points. When the basic prediction unit consists of one sampling point, the processing subunit 6041 is configured to: separately obtain absolute differences between values of the sampling point in the N predictions of the basic prediction unit and a value of the sampling point in the prediction selection reference of the basic prediction unit to obtain the N prediction errors of the basic prediction unit; or separately obtain squares of differences between values of the sampling point in the N predictions of the basic prediction unit and a value of the sampling point in the prediction selection reference of the basic prediction unit to obtain the N prediction errors of the basic prediction unit, or the determining subunit 6043 may be configured to: separately obtain absolute differences between values of the sampling point in the N predictions of the basic prediction unit and a value of the sampling point in the prediction selection reference of the basic prediction unit to obtain the N prediction errors of the basic prediction unit; or separately obtain squares of differences between values of the sampling point in the N predictions of the basic prediction unit and a value of the sampling point in the prediction selection reference of the basic prediction unit to obtain the N prediction errors of the basic prediction unit.

When the basic prediction unit consists of one sampling point, the processing subunit 6041 is configured to: separately obtain differences between values of the sampling point in the N predictions of the basic prediction unit and a value of the sampling point in the prediction selection reference of the basic prediction unit, perform filtering processing on each of the differences, and obtain absolute values, to obtain the N prediction errors of the basic prediction unit; or separately perform filtering processing on values of the sampling point in the N predictions of the basic prediction unit, perform filtering processing on a value of the sampling point in the prediction selection reference of the basic prediction unit, and separately obtain absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit, or the determining subunit 6043 may be configured to: separately obtain differences between values of the sampling point in the N predictions of the basic prediction unit and a value of the sampling point in the prediction selection reference of the basic prediction unit, perform filtering processing on each of the differences, and obtain absolute values, to obtain the N prediction errors of the basic prediction unit; or separately perform filtering processing on values of the sampling point in the N predictions of the basic prediction unit, perform filtering processing on a value of the sampling point in the prediction selection reference of the basic prediction unit, and separately obtain absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

When the basic prediction unit consists of multiple sampling points, the processing subunit 6041 is configured to: separately obtain absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit; and separately acquire the sum of all absolute differences in each absolute-difference set in the N absolute-difference sets to obtain the N prediction errors of the basic prediction unit; or separately acquire the sum of squares of all absolute differences in each absolute-difference set in the N absolute-difference sets to obtain the N prediction errors of the basic prediction unit; or separately acquire high-order norms of all absolute differences in each absolute-difference set in the N absolute-difference sets to obtain the N prediction errors of the basic prediction unit, or the determining subunit 6043 may be configured to: separately obtain absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit; and separately acquire the sum of all absolute differences in each absolute-difference set in the N absolute-difference sets to obtain the N prediction errors of the basic prediction unit; or separately acquire the sum of squares of all absolute differences in each absolute-difference set in the N absolute-difference sets to obtain the N prediction errors of the basic prediction unit; or separately acquire high-order norms of all absolute differences in each absolute-difference set in the N absolute-difference sets to obtain the N prediction errors of the basic prediction unit.

It should be noted that, the first acquiring unit 601 is configured to: acquire N candidate motion information sets of the target area, where each of the candidate motion information sets has at least 1 piece of candidate motion information; separately select 1 piece of candidate motion information from each candidate motion information set in the N candidate motion information sets, to obtain W motion information combinations, where each of the motion information combinations has N pieces of motion information; separately perform a motion compensation operation on the target area by using each motion information combination in the W motion information combinations to obtain W prediction combinations, where each of the prediction combinations includes the N predictions of the target area; acquire the prediction selection reference; separately compare the N predictions of the target area in each of the prediction combinations with the prediction selection reference to determine an optimal prediction meeting a preset condition; and determine N pieces of motion information in a motion information combination corresponding to the optimal prediction as the N pieces of motion information of the target area.

Figure 17:
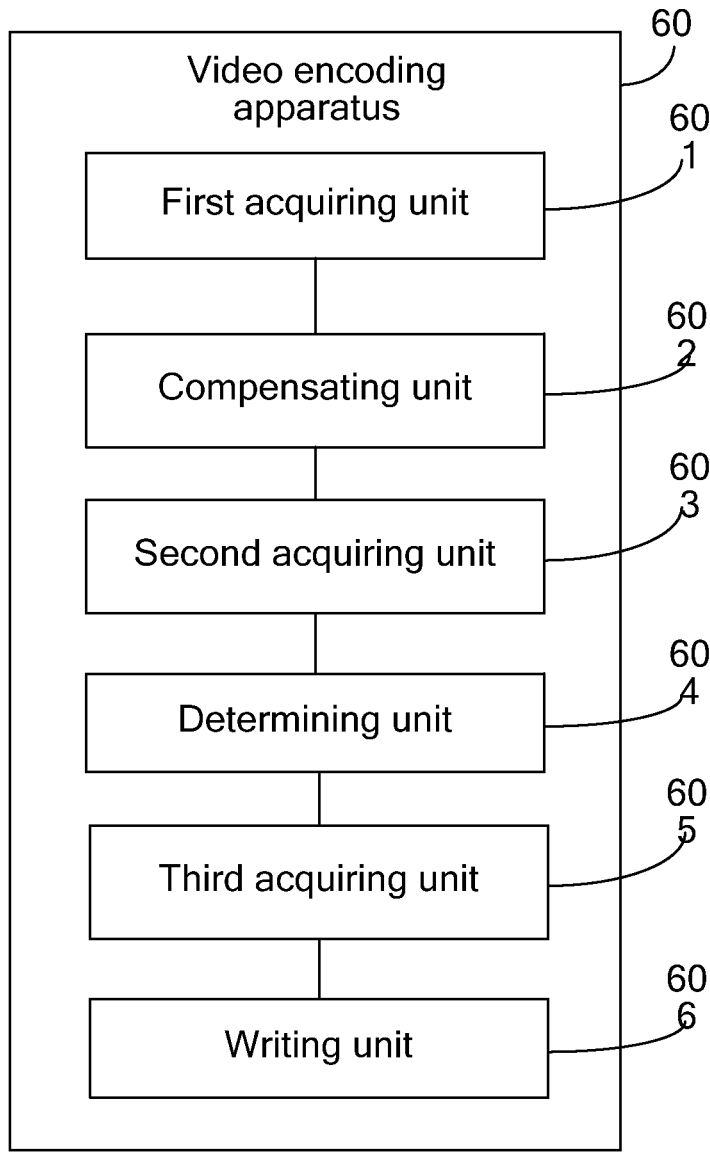
FIG. 17 is a schematic structural diagram of another video encoding apparatus according to an embodiment of the present disclosure.

It should be noted that, as shown in FIG. 17, the encoding apparatus 60 further includes a third acquiring unit 605 configured to configured to after the final prediction of the target area is determined according to the N predictions of the target area and the prediction selection reference of the target area, obtain N pieces of motion-related information according to the N pieces of motion information, and a writing unit 606 configured to convert the N pieces of motion-related information into a binary string and write the binary string to a bitstream.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the video encoding apparatus provide in this embodiment of the present disclosure, the first acquiring unit acquires a preset quantity of pieces of motion information for one target area, and the determining unit determines a final prediction of the target area according to predictions obtained by the compensating unit according to the preset quantity of pieces of motion information and a prediction selection reference acquired by the second acquiring unit. As compared with the, picture partition does not need to be performed; moreover, multiple predictions obtained according to descriptions that are of one same target area and indicated by multiple pieces of motion information are more accurate, and the final prediction of the target area determined according to the multiple predictions and the prediction selection reference has higher accuracy. Therefore, video decoding performance can be enhanced, and decoding precision can be improved.

It should be noted that, the video encoding apparatus may be an encoder.

Figure 18:
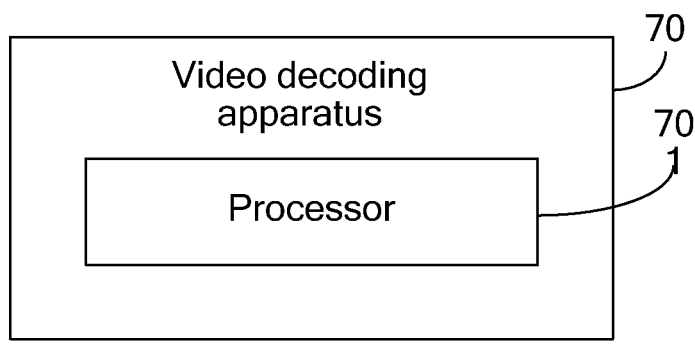
FIG. 18 is a schematic structural diagram of another video decoding apparatus according to an embodiment of the present disclosure.

An embodiment of the present disclosure provides a video decoding apparatus 70. As shown in FIG. 18, the apparatus includes a processor 701 configured to acquire N pieces of motion information of a target area according to motion-related information in a bitstream generated by an encoder end, where N is an integer greater than or equal to 2, and the target area consists of M basic prediction units, where M is greater than or equal to 2, the processor 701 is further configured to separately perform a motion compensation operation on the target area by using each piece of motion information in the N pieces of motion information to obtain N predictions of the target area, where each prediction in the N predictions of the target area includes predicted values of all sampling points in the target area, the processor 701 is further configured to acquire a prediction selection reference of the target area, where the prediction selection reference of the target area is values of all sampling points in a corresponding reference area of the target area, and the processor 701 is further configured to determine a final prediction of the target area according to the N predictions of the target area and the prediction selection reference of the target area.

In this way, the processor acquires a preset quantity of pieces of motion information for one target area, and determines a final prediction of the target area according to predictions obtained according to the preset quantity of pieces of motion information and a prediction selection reference. As compared with the, picture partition does not need to be performed; moreover, multiple predictions obtained according to descriptions that are of one same target area and indicated by multiple pieces of motion information are more accurate, and the final prediction of the target area determined according to the multiple predictions and the prediction selection reference has higher accuracy. Therefore, video decoding performance can be enhanced, and decoding precision can be improved.

The processor 701 is configured to determine a final prediction of the basic prediction unit according to N predictions of the basic prediction unit and a prediction selection reference of the basic prediction unit.

The processor 701 is configured to calculate N prediction errors of the basic prediction unit according to the N predictions of the basic prediction unit and the prediction selection reference of the basic prediction unit; and compare the N prediction errors of the basic prediction unit, and acquire a prediction, corresponding to a minimum prediction error, of the basic prediction unit as the final prediction of the basic prediction unit.

The basic prediction unit consists of one or more sampling points.

When the basic prediction unit consists of one sampling point, the processor 701 is configured to: separately obtain absolute differences between values of the sampling point in the N predictions of the basic prediction unit and a value of the sampling point in the prediction selection reference of the basic prediction unit to obtain the N prediction errors of the basic prediction unit; or separately obtain squares of differences between values of the sampling point in the N predictions of the basic prediction unit and a value of the sampling point in the prediction selection reference of the basic prediction unit to obtain the N prediction errors of the basic prediction unit.

When the basic prediction unit consists of one sampling point, the processor 701 is configured to: separately obtain differences between values of the sampling point in the N predictions of the basic prediction unit and a value of the sampling point in the prediction selection reference of the basic prediction unit, perform filtering processing on each of the differences, and obtain absolute values, to obtain the N prediction errors of the basic prediction unit; or separately perform filtering processing on values of the sampling point in the N predictions of the basic prediction unit, perform filtering processing on a value of the sampling point in the prediction selection reference of the basic prediction unit, and separately obtain absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

When the basic prediction unit consists of multiple sampling points, the processor 701 is configured to: separately obtain absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit; and separately acquire the sum of all absolute differences in each absolute-difference set in the N absolute-difference sets to obtain the N prediction errors of the basic prediction unit; or separately acquire the sum of squares of all absolute differences in each absolute-difference set in the N absolute-difference sets to obtain the N prediction errors of the basic prediction unit; or separately acquire high-order norms of all absolute differences in each absolute-difference set in the N absolute-difference sets to obtain the N prediction errors of the basic prediction unit.

Further, the processor 701 is further configured to: determine N weighting factors of the basic prediction unit according to the N predictions of the basic prediction unit and the prediction selection reference of the basic prediction unit; and perform weighted averaging on the N predictions of the basic prediction unit by using the N weighting factors to obtain the final prediction of the basic prediction unit.

The processor 701 may calculate N prediction errors of the basic prediction unit according to the N predictions of the basic prediction unit and the prediction selection reference of the basic prediction unit, and separately obtain reciprocals of the N prediction errors of the basic prediction unit to obtain the N weighting factors of the basic prediction unit.

It may be clearly understood by a person skilled in the art that, for the purpose of convenient and brief description, for a detailed working process of the foregoing apparatus and processor, reference may be made to a corresponding process in the foregoing method embodiments, and details are not described herein again.

It should be noted that, the video decoding apparatus may be a decoder.

Figure 19:
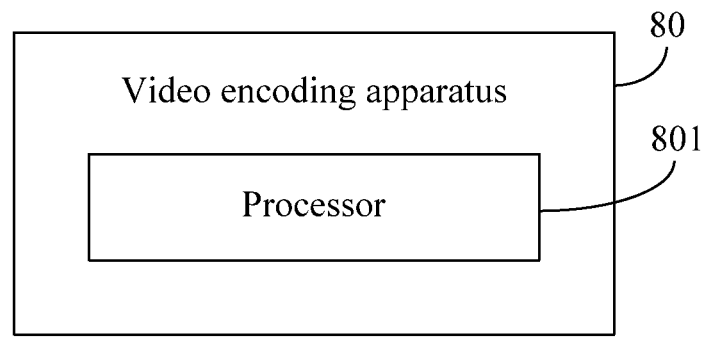
FIG. 19 is a schematic structural diagram of still another video encoding apparatus according to an embodiment of the present disclosure.

An embodiment of the present disclosure provides a video encoding apparatus 80. As shown in FIG. 19, the apparatus includes a processor 801 configured to determine N pieces of motion information of a target area, where N is an integer greater than or equal to 2, and the target area consists of M basic prediction units, where M is greater than or equal to 2, the processor 801 is further configured to separately perform a motion compensation operation on the target area by using each piece of motion information in the N pieces of motion information to obtain N predictions of the target area, where each prediction in the N predictions of the target area includes predicted values of all sampling points in the target area, the processor 801 is further configured to acquire a prediction selection reference of the target area, where the prediction selection reference of the target area is values of all sampling points in a corresponding reference area of the target area, and the processor 801 is further configured to determine a final prediction of the target area according to the N predictions of the target area and the prediction selection reference of the target area.

In this way, the processor acquires a preset quantity of pieces of motion information for one target area, and determines a final prediction of the target area according to predictions obtained according to the preset quantity of pieces of motion information and an acquired prediction selection reference. As compared with the, picture partition does not need to be performed; moreover, multiple predictions obtained according to descriptions that are of one same target area and indicated by multiple pieces of motion information are more accurate, and the final prediction of the target area determined according to the multiple predictions and the prediction selection reference has higher accuracy. Therefore, video encoding performance can be enhanced, and decoding precision can be improved.

The processor 801 is configured to determine a final prediction of the basic prediction unit according to N predictions of the basic prediction unit and a prediction selection reference of the basic prediction unit.

The processor 801 is configured to calculate N prediction errors of the basic prediction unit according to the N predictions of the basic prediction unit and the prediction selection reference of the basic prediction unit; and compare the N prediction errors of the basic prediction unit, and acquire a prediction, corresponding to a minimum prediction error, of the basic prediction unit as the final prediction of the basic prediction unit.

The basic prediction unit consists of one or more sampling points. When the basic prediction unit consists of one sampling point, the processor 801 is configured to: separately obtain absolute differences between values of the sampling point in the N predictions of the basic prediction unit and a value of the sampling point in the prediction selection reference of the basic prediction unit to obtain the N prediction errors of the basic prediction unit; or separately obtain squares of differences between values of the sampling point in the N predictions of the basic prediction unit and a value of the sampling point in the prediction selection reference of the basic prediction unit to obtain the N prediction errors of the basic prediction unit.

When the basic prediction unit consists of one sampling point, the processor 801 is configured to: separately obtain differences between values of the sampling point in the N predictions of the basic prediction unit and a value of the sampling point in the prediction selection reference of the basic prediction unit, perform filtering processing on each of the differences, and obtain absolute values, to obtain the N prediction errors of the basic prediction unit; or separately perform filtering processing on values of the sampling point in the N predictions of the basic prediction unit, perform filtering processing on a value of the sampling point in the prediction selection reference of the basic prediction unit, and separately obtain absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

When the basic prediction unit consists of multiple sampling points, the processor 801 is configured to: separately obtain absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit; and separately acquire the sum of all absolute differences in each absolute-difference set in the N absolute-difference sets to obtain the N prediction errors of the basic prediction unit; or separately acquire the sum of squares of all absolute differences in each absolute-difference set in the N absolute-difference sets to obtain the N prediction errors of the basic prediction unit; or separately acquire high-order norms of all absolute differences in each absolute-difference set in the N absolute-difference sets to obtain the N prediction errors of the basic prediction unit.

The processor 801 may be further configured to determine N weighting factors of the basic prediction unit according to the N predictions of the basic prediction unit and the prediction selection reference of the basic prediction unit; and perform weighted averaging on the N predictions of the basic prediction unit by using the N weighting factors to obtain the final prediction of the basic prediction unit.

The processor 801 may calculate N prediction errors of the basic prediction unit according to the N predictions of the basic prediction unit and the prediction selection reference of the basic prediction unit, and separately obtain reciprocals of the N prediction errors of the basic prediction unit to obtain the N weighting factors of the basic prediction unit.

It should be noted that, the processor 801 may be further configured to: acquire N candidate motion information sets of the target area, where each of the candidate motion information sets has at least 1 piece of candidate motion information; separately select 1 piece of candidate motion information from each candidate motion information set in the N candidate motion information sets, to obtain W motion information combinations, where each of the motion information combinations has N pieces of motion information; separately perform a motion compensation operation on the target area by using each motion information combination in the W motion information combinations to obtain W prediction combinations, where each of the prediction combinations includes the N predictions of the target area; acquire the prediction selection reference; separately compare the N predictions of the target area in each of the prediction combinations with the prediction selection reference to determine an optimal prediction meeting a preset condition; and determine N pieces of motion information in a motion information combination corresponding to the optimal prediction as the N pieces of motion information of the target area.

The processor 801 may be further configured to: after the final prediction of the target area is determined according to the N predictions of the target area and the prediction selection reference of the target area, obtain N pieces of motion-related information according to the N pieces of motion information; and convert the N pieces of motion-related information into a binary string and write the binary string to a bitstream.

It may be clearly understood by a person skilled in the art that, for the purpose of convenient and brief description, for a detailed working process of the foregoing apparatus and processor, reference may be made to a corresponding process in the foregoing method embodiments, and details are not described herein again.

It should be noted that, the video encoding apparatus may be an encoder.

Figure 20:
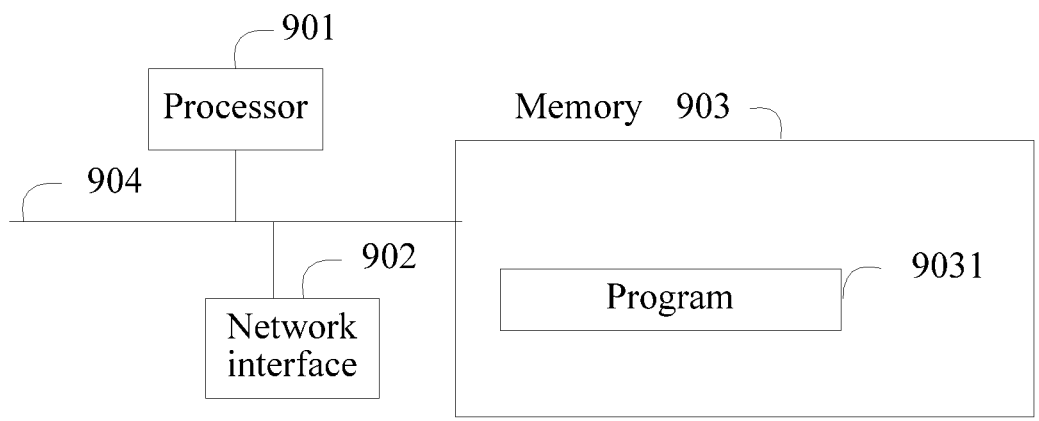
FIG. 20 is a schematic structural diagram of still another video decoding apparatus according to an embodiment of the present disclosure.

FIG. 20 describes a structure of a video decoding apparatus 90 according to another embodiment of the present disclosure, where the video decoding apparatus 90 includes at least one processor 901 (for example, a central processing unit (CPU)), at least one network interface 902 or another communications interface, a memory 903, and at least one communications bus 904 configured to implement connection and communication between the apparatuses. The processor 901 is configured to execute an executable module stored in the memory 903, for example, a computer program. The memory 903 may include a high-speed random access memory (RAM), and may further include a non-volatile memory, for example, at least one magnetic disk storage. A communications connection between the decoding apparatus 90 and at least another network element is implemented by using the at least one network interface 902 (which may be wired or wireless), and the Internet, a wide area network, a local area network, a metropolitan area network, or the like may be used.

In some implementation manners, the memory 903 stores a program 9031, the program 9031 may be executed by the processor 901, and the program 9031 includes acquiring N pieces of motion information of a target area according to motion-related information in a bitstream generated by an encoder end, where N is an integer greater than or equal to 2, separately performing a motion compensation operation on the target area by using each piece of motion information in the N pieces of motion information to obtain N predictions of the target area, where each prediction in the N predictions of the target area includes predicted values of all sampling points in the target area, acquiring a prediction selection reference of the target area, where the prediction selection reference of the target area is values of all sampling points in a corresponding reference area of the target area, and determining a final prediction of the target area according to the N predictions of the target area and the prediction selection reference of the target area.

The target area consists of M basic prediction units, where M is greater than or equal to 2, and the determining a final prediction of the target area according to the N predictions of the target area and the prediction selection reference of the target area includes determining a final prediction of the basic prediction unit according to N predictions of the basic prediction unit and a prediction selection reference of the basic prediction unit, where each prediction in the N predictions of the basic prediction unit consists of predicted values of all sampling points in the basic prediction unit, and the prediction selection reference of the basic prediction unit is values of all sampling points of a reference area corresponding to the basic prediction unit.

The determining a final prediction of the basic prediction unit according to N predictions of the basic prediction unit and a prediction selection reference of the basic prediction unit includes calculating N prediction errors of the basic prediction unit according to the N predictions of the basic prediction unit and the prediction selection reference of the basic prediction unit, and comparing the N prediction errors of the basic prediction unit, and acquiring a prediction, corresponding to a minimum prediction error, of the basic prediction unit as the final prediction of the basic prediction unit.

The determining a final prediction of the basic prediction unit according to N predictions of the basic prediction unit and a prediction selection reference of the basic prediction unit includes determining N weighting factors of the basic prediction unit according to the N predictions of the basic prediction unit and the prediction selection reference of the basic prediction unit, and performing weighted averaging on the N predictions of the basic prediction unit by using the N weighting factors to obtain the final prediction of the basic prediction unit.

The determining N weighting factors of the basic prediction unit according to the N predictions of the basic prediction unit and the prediction selection reference of the basic prediction unit includes calculating N prediction errors of the basic prediction unit according to the N predictions of the basic prediction unit and the prediction selection reference of the basic prediction unit, and separately obtaining reciprocals of the N prediction errors of the basic prediction unit to obtain the N weighting factors of the basic prediction unit.

The basic prediction unit consists of one or more sampling points.

When the basic prediction unit consists of one sampling point, the calculating N prediction errors of the basic prediction unit according to the N predictions of the basic prediction unit and the prediction selection reference of the basic prediction unit includes separately obtaining absolute differences between values of the sampling point in the N predictions of the basic prediction unit and a value of the sampling point in the prediction selection reference of the basic prediction unit to obtain the N prediction errors of the basic prediction unit, or separately obtaining squares of differences between values of the sampling point in the N predictions of the basic prediction unit and a value of the sampling point in the prediction selection reference of the basic prediction unit to obtain the N prediction errors of the basic prediction unit.

When the basic prediction unit consists of one sampling point, the calculating N prediction errors of the basic prediction unit according to the N predictions of the basic prediction unit and the prediction selection reference of the basic prediction unit includes separately obtaining differences between values of the sampling point in the N predictions of the basic prediction unit and a value of the sampling point in the prediction selection reference of the basic prediction unit, performing filtering processing on each of the differences, and obtaining absolute values, to obtain the N prediction errors of the basic prediction unit, or separately performing filtering processing on values of the sampling point in the N predictions of the basic prediction unit, performing filtering processing on a value of the sampling point in the prediction selection reference of the basic prediction unit, and separately obtaining absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

When the basic prediction unit consists of multiple sampling points, the calculating N prediction errors of the basic prediction unit according to the N predictions of the basic prediction unit and the prediction selection reference of the basic prediction unit includes separately obtaining absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit, and separately acquiring the sum of all absolute differences in each absolute-difference set in the N absolute-difference sets to obtain the N prediction errors of the basic prediction unit, or separately acquiring the sum of squares of all absolute differences in each absolute-difference set in the N absolute-difference sets to obtain the N prediction errors of the basic prediction unit, or separately acquiring high-order norms of all absolute differences in each absolute-difference set in the N absolute-difference sets to obtain the N prediction errors of the basic prediction unit.

It should be noted that, the video encoding apparatus may be a decoder.

Figure 21:
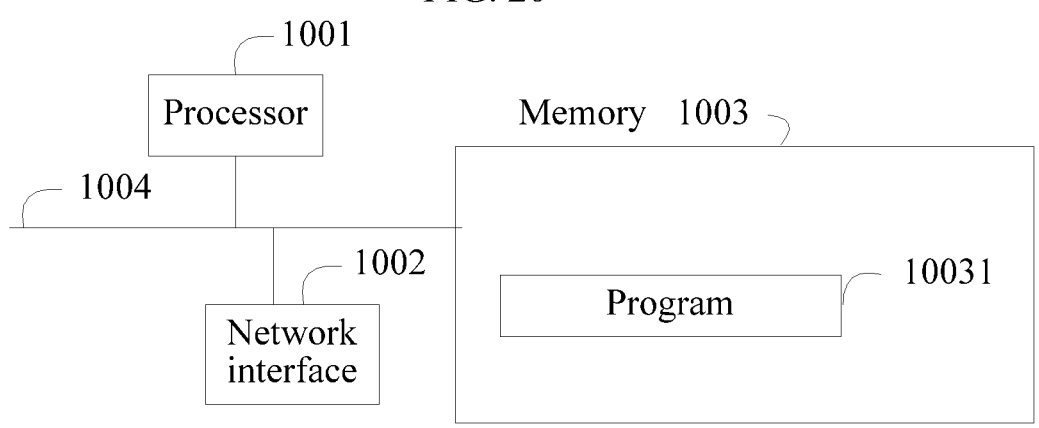
FIG. 21 is a schematic structural diagram of yet another video encoding apparatus according to an embodiment of the present disclosure.

FIG. 21 describes a structure of a video encoding apparatus 100 according to another embodiment of the present disclosure, where the video encoding apparatus 100 includes at least one processor 1001 (for example, a CPU), at least one network interface 1002 or another communications interface, a memory 1003, and at least one communications bus 1004 configured to implement connection and communication between the apparatuses. The processor 1001 is configured to execute an executable module stored in the memory 1003, for example, a computer program. The memory 1003 may include a high-speed RAM, and may further include a non-volatile memory, for example, at least one magnetic disk storage. A communications connection between the encoding apparatus 100 and at least another network element is implemented by using the at least one network interface 1002 (which may be wired or wireless), and the Internet, a wide area network, a local area network, a metropolitan area network, or the like may be used.

In some implementation manners, the memory 1003 stores a program 10031, the program 10031 may be executed by the processor 1001, and the program 10031 includes determining N pieces of motion information of a target area, where N is an integer greater than or equal to 2, separately performing a motion compensation operation on the target area by using each piece of motion information in the N pieces of motion information to obtain N predictions of the target area, where each prediction in the N predictions of the target area includes predicted values of all sampling points in the target area, acquiring a prediction selection reference of the target area, where the prediction selection reference of the target area is values of all sampling points in a corresponding reference area of the target area, and determining a final prediction of the target area according to the N predictions of the target area and the prediction selection reference of the target area.

The target area consists of M basic prediction units, where M is greater than or equal to 2, and the determining a final prediction of the target area according to the N predictions of the target area and the prediction selection reference of the target area includes determining a final prediction of the basic prediction unit according to N predictions of the basic prediction unit and a prediction selection reference of the basic prediction unit, where each prediction in the N predictions of the basic prediction unit consists of predicted values of all sampling points in the basic prediction unit, and the prediction selection reference of the basic prediction unit is values of all sampling points of a reference area corresponding to the basic prediction unit.

The determining a final prediction of the basic prediction unit according to N predictions of the basic prediction unit and a prediction selection reference of the basic prediction unit includes calculating N prediction errors of the basic prediction unit according to the N predictions of the basic prediction unit and the prediction selection reference of the basic prediction unit, and comparing the N prediction errors of the basic prediction unit, and acquiring a prediction, corresponding to a minimum prediction error, of the basic prediction unit as the final prediction of the basic prediction unit.

The determining a final prediction of the basic prediction unit according to N predictions of the basic prediction unit and a prediction selection reference of the basic prediction unit includes determining N weighting factors of the basic prediction unit according to the N predictions of the basic prediction unit and the prediction selection reference of the basic prediction unit, and performing weighted averaging on the N predictions of the basic prediction unit by using the N weighting factors to obtain the final prediction of the basic prediction unit.

The determining N weighting factors of the basic prediction unit according to the N predictions of the basic prediction unit and the prediction selection reference of the basic prediction unit includes calculating N prediction errors of the basic prediction unit according to the N predictions of the basic prediction unit and the prediction selection reference of the basic prediction unit, and separately obtaining reciprocals of the N prediction errors of the basic prediction unit to obtain the N weighting factors of the basic prediction unit.

The basic prediction unit consists of one or more sampling points.

When the basic prediction unit consists of one sampling point, the calculating N prediction errors of the basic prediction unit according to the N predictions of the basic prediction unit and the prediction selection reference of the basic prediction unit includes separately obtaining absolute differences between values of the sampling point in the N predictions of the basic prediction unit and a value of the sampling point in the prediction selection reference of the basic prediction unit to obtain the N prediction errors of the basic prediction unit, or separately obtaining squares of differences between values of the sampling point in the N predictions of the basic prediction unit and a value of the sampling point in the prediction selection reference of the basic prediction unit to obtain the N prediction errors of the basic prediction unit.

When the basic prediction unit consists of one sampling point, the calculating N prediction errors of the basic prediction unit according to the N predictions of the basic prediction unit and the prediction selection reference of the basic prediction unit includes separately obtaining differences between values of the sampling point in the N predictions of the basic prediction unit and a value of the sampling point in the prediction selection reference of the basic prediction unit, performing filtering processing on each of the differences, and obtaining absolute values, to obtain the N prediction errors of the basic prediction unit, or separately performing filtering processing on values of the sampling point in the N predictions of the basic prediction unit, performing filtering processing on a value of the sampling point in the prediction selection reference of the basic prediction unit, and separately obtaining absolute differences between values of the sampling point in the N predictions of the basic prediction unit after the filtering processing and a value of the sampling point in the prediction selection reference of the basic prediction unit after the filtering processing, to obtain the N prediction errors of the basic prediction unit.

When the basic prediction unit consists of multiple sampling points, the calculating N prediction errors of the basic prediction unit according to the N predictions of the basic prediction unit and the prediction selection reference of the basic prediction unit includes separately obtaining absolute differences between values of sampling points at same positions in the N predictions of the basic prediction unit and in the prediction selection reference of the basic prediction unit to obtain N absolute-difference sets, where each of the absolute-difference sets includes absolute differences of all the sampling points of the basic prediction unit, and separately acquiring the sum of all absolute differences in each absolute-difference set in the N absolute-difference sets to obtain the N prediction errors of the basic prediction unit, or separately acquiring the sum of squares of all absolute differences in each absolute-difference set in the N absolute-difference sets to obtain the N prediction errors of the basic prediction unit, or separately acquiring high-order norms of all absolute differences in each absolute-difference set in the N absolute-difference sets to obtain the N prediction errors of the basic prediction unit.

The determining N pieces of motion information of a target area includes acquiring N candidate motion information sets of the target area, where each of the candidate motion information sets has at least 1 piece of candidate motion information, separately selecting 1 piece of candidate motion information from each candidate motion information set in the N candidate motion information sets, to obtain W motion information combinations, where each of the motion information combinations has N pieces of motion information, separately performing a motion compensation operation on the target area by using each motion information combination in the W motion information combinations to obtain W prediction combinations, where each of the prediction combinations includes N predictions of the target area, acquiring the prediction selection reference, separately comparing the N predictions of the target area in each of the prediction combinations with the prediction selection reference to determine an optimal prediction meeting a preset condition, and determining N pieces of motion information in a motion information combination corresponding to the optimal prediction as the N pieces of motion information of the target area.

After the determining N pieces of motion information of a target area, the method further includes obtaining N pieces of motion-related information according to the N pieces of motion information, and converting the N pieces of motion-related information into a binary string and writing the binary string to a bitstream.

Figure 22:
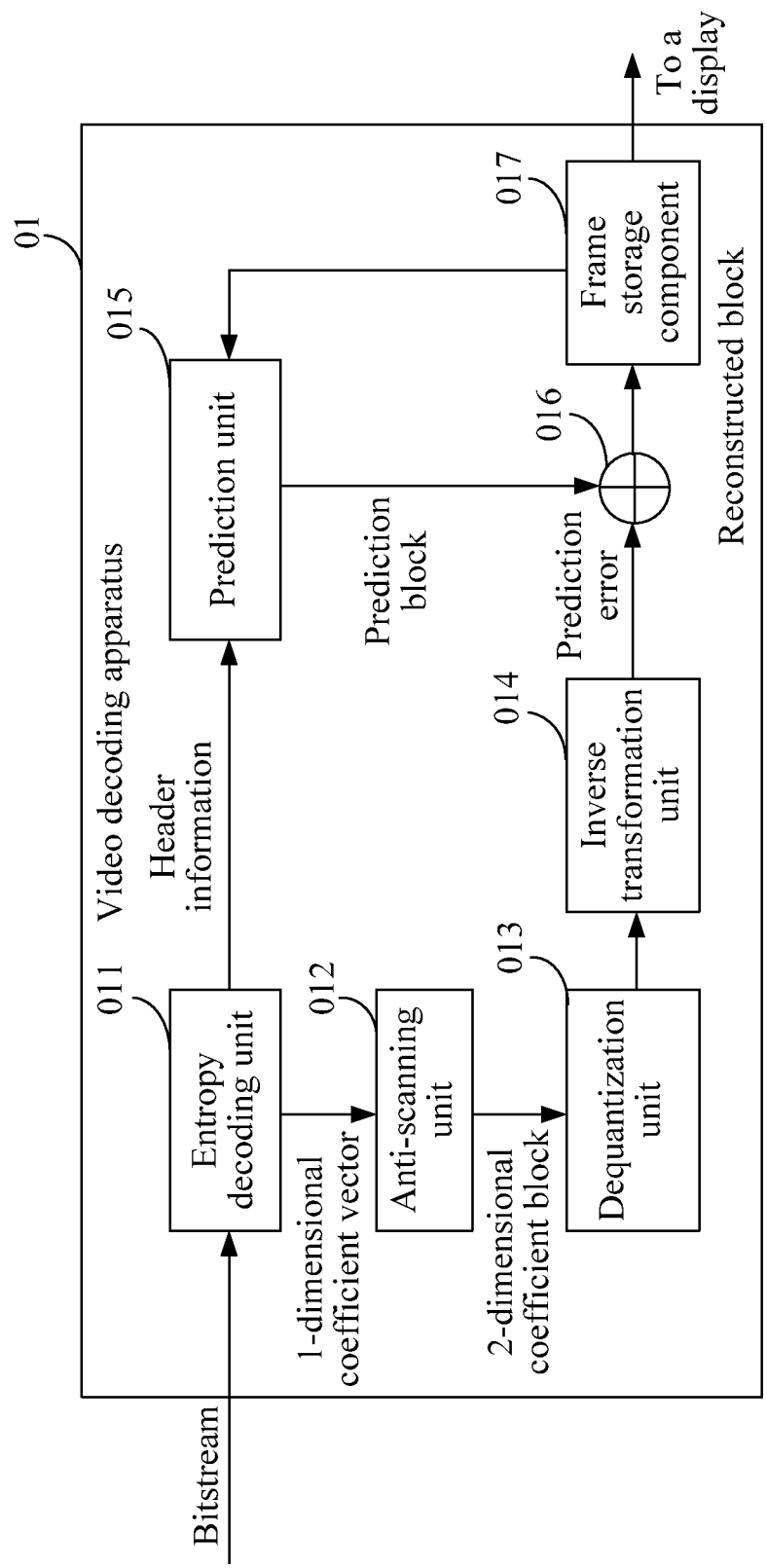
FIG. 22 is a schematic structural diagram of yet another video decoding apparatus according to an embodiment of the present disclosure.

In practical application, when a target area is a rectangular picture block, a structure of a video decoding apparatus 01 is that shown in FIG. 22, including: an entropy decoding unit 011, an anti-scanning unit 012, a dequantization unit 013, an inverse transformation unit 014, a prediction unit 015, a combining unit 016, and a frame storage component 017. The video decoding apparatus 01 may be located in a handheld terminal device such as a mobile phone or a tablet computer or a wearable terminal device having a video playing function, or may be located in an apparatus such as a notebook computer, a desktop computer, or a media processing function node of a communications network. When a bitstream generated by an encoder end passes through the entropy decoding unit 011, the entropy decoding unit 011 performs entropy decoding processing on the bitstream to obtain a reconstruction value of a set of prediction errors and header information (including motion information), and the reconstruction value of the set of prediction errors may be considered as a 1-dimensional coefficient vector. Then the 1-dimensional coefficient vector passes through the anti-scanning unit 012, and the anti-scanning unit 012 performs anti-scanning processing to obtain a 2-dimensional coefficient block. The dequantization unit 013 performs dequantization processing on the 2-dimensional coefficient block, and the inverse transformation unit 013 performs inverse transformation processing on the 2-dimensional coefficient block, so that prediction errors of the target area are obtained. Moreover, the header information is processed by the prediction unit 015, so that a final prediction of the target area is obtained. For the processing process, reference may be made to a video decoding method provided in an embodiment of the present disclosure. The prediction errors and the final prediction are combined by the combining unit 016 so that a reconstructed block is obtained, and the reconstructed block is stored by the frame storage component 017, and may be displayed on a display of the apparatus such as a mobile phone or a notebook computer when a video is played, and may also help determine the final prediction subsequently when the prediction unit 015 processes the header information. Particularly, in this embodiment of the present disclosure, a function of the first acquiring unit 501 in FIG. 11 may be implemented in the entropy decoding unit 011 of the video decoding apparatus 01, and functions of the compensating unit 502, the second acquiring unit 503, and the determining unit 504 in FIG. 11 all may be implemented in the prediction unit 015 of the video decoding apparatus 01.

It should be noted that, the methods or apparatuses disclosed in the foregoing embodiments of the present disclosure may be applied to a processor. The processor may be an integrated circuit chip, for example, a processing chip in a mobile phone terminal, or may be a dedicated chip used for processing graphics, pictures, and videos and integrated into the chip of the mobile phone terminal, having a capability of processing a video signal. The methods or apparatuses disclosed in the foregoing embodiments of the present disclosure may also be implemented by means of software, where steps of the methods may be completed by using an integrated logical circuit of hardware in the processor or an instruction in a form of software, for example, a terminal or computer into which the instruction program is integrated. The processor may be a general purpose processor, a digital signal processor (DSP), an application-specific integrated circuit (ASIC), a field programmable gate array (FPGA) or another programmable logical device, discrete gate or transistor logical device, or discrete hardware component. The processor may implement or execute methods, steps and logical block diagrams disclosed in the embodiments of the present disclosure. A general purpose processor may be a microprocessor or the processor may also be any conventional processor and the like. Steps of the methods disclosed with reference to the embodiments of the present disclosure may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The steps of the foregoing methods are completed in combination with hardware thereof.

It should be noted that, the present disclosure covers products or devices that may be constructed by using the methods and apparatuses and have a video processing function, for example, (but not limited to) the following various electronic apparatuses: a mobile phone (including a smartphone), a personal digital assistant (PDA), a handheld or portable computer, a camera, an Moving Picture Experts Group-4, Part 14 (MP4) player, a camcorder, a television monitor, a flat-panel display, a computer monitor, and an electronic photo.

In the several embodiments provided in the present application, it should be understood that the disclosed apparatus and method may be implemented in other manners. For example, the described apparatus embodiment is merely exemplary. For example, the unit partition is merely logical function partition and may be other partition in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM), a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A video decoding method, which is applied to a decoder end, comprising:
    acquiring N pieces of motion information of a target area according to motion-related information in a bitstream generated by an encoder end, wherein N is an integer greater than or equal to 2;
    performing a motion compensation operation on the target area separately by using each piece of motion information in the N pieces of motion information to obtain N predictions of the target area, wherein each prediction in the N predictions of the target area comprises predicted values of all sampling points in the target area;
    acquiring a prediction selection reference of the target area, wherein the prediction selection reference of the target area comprises values of all sampling points in a corresponding reference area of the target area; and
    determining a final prediction of the target area according to the N predictions of the target area and the prediction selection reference of the target area,
    wherein the target area consists of M basic prediction units,
    wherein M is greater than or equal to 2,
    wherein determining the final prediction of the target area according to the N predictions of the target area and the prediction selection reference of the target area comprises determining a final prediction of a selected basic prediction unit according to N predictions of the selected basic prediction unit and a prediction selection reference of the selected basic prediction unit,
    wherein each prediction in the N predictions of the selected basic prediction unit comprises predicted values of all sampling points in the selected basic prediction unit,
    wherein the prediction selection reference of the selected basic prediction unit comprises values of all sampling points of a basic prediction unit in a reference area of the target area, and
    wherein the basic prediction unit in the reference area of the target area is located at a same position as a basic prediction unit of the target area.

2. The method according to claim 1, wherein determining the final prediction of the selected basic prediction unit according to the N predictions of the selected basic prediction unit and the prediction selection reference of the selected basic prediction unit comprises:
calculating N prediction errors of the selected basic prediction unit according to the N predictions of the selected basic prediction unit and the prediction selection reference of the selected basic prediction unit;
comparing the N prediction errors of the selected basic prediction unit; and
acquiring a prediction, corresponding to a minimum prediction error, of the selected basic prediction unit as the final prediction of the selected basic prediction unit.

3. The method according to claim 1, wherein determining the final prediction of the selected basic prediction unit according to the N predictions of the selected basic prediction unit and the prediction selection reference of the selected basic prediction unit comprises:
determining N weighting factors of the selected basic prediction unit according to the N predictions of the selected basic prediction unit and the prediction selection reference of the selected basic prediction unit; and
performing weighted averaging on the N predictions of the selected basic prediction unit by using the N weighting factors to obtain the final prediction of the selected basic prediction unit.

4. The method according to claim 3, wherein determining the N weighting factors of the selected basic prediction unit according to the N predictions of the selected basic prediction unit and the prediction selection reference of the selected basic prediction unit comprises:
calculating N prediction errors of the selected basic prediction unit according to the N predictions of the selected basic prediction unit and the prediction selection reference of the selected basic prediction unit; and
obtaining reciprocals of the N prediction errors of the selected basic prediction unit separately to obtain the N weighting factors of the selected basic prediction unit.

5. The method according to claim 2, wherein the selected basic prediction unit consists of one or more sampling points.

6. The method according to claim 2, wherein when the selected basic prediction unit consists of one sampling point, calculating the N prediction errors of the selected basic prediction unit according to the N predictions of the selected basic prediction unit and the prediction selection reference of the selected basic prediction unit comprises one of the following:
obtaining absolute differences between values of the sampling point in the N predictions of the selected basic prediction unit and a value of the sampling point in the prediction selection reference of the selected basic prediction unit separately to obtain the N prediction errors of the selected basic prediction unit; or
obtaining squares of differences between the values of the sampling point in the N predictions of the selected basic prediction unit and the value of the sampling point in the prediction selection reference of the selected basic prediction unit separately to obtain the N prediction errors of the selected basic prediction unit.

7. The method according to claim 2, wherein when the selected basic prediction unit consists of one sampling point, calculating the N prediction errors of the basic prediction unit according to the N predictions of the selected basic prediction unit and the prediction selection reference of the selected basic prediction unit comprises one of the following:
obtaining differences between values of the sampling point in the N predictions of the selected basic prediction unit and a value of the sampling point in the prediction selection reference of the selected basic prediction unit separately, performing filtering processing on each of the differences, and obtaining absolute values, to obtain the N prediction errors of the selected basic prediction unit; or
performing filtering processing on the values of the sampling point in the N predictions of the selected basic prediction unit separately, performing filtering processing on the value of the sampling point in the prediction selection reference of the selected basic prediction unit, and obtaining absolute differences between the values of the sampling point in the N predictions of the selected basic prediction unit separately after the filtering processing and the value of the sampling point in the prediction selection reference of the selected basic prediction unit after the filtering processing, to obtain the N prediction errors of the selected basic prediction unit.

8. The method according to claim 2, wherein when the selected basic prediction unit consists of multiple sampling points, calculating N prediction errors of the selected basic prediction unit according to the N predictions of the selected basic prediction unit and the prediction selection reference of the selected basic prediction unit comprises:
obtaining absolute differences between values of sampling points at the same positions in the N predictions of the selected basic prediction unit and in the prediction selection reference of the selected basic prediction unit separately to obtain N absolute-difference sets, wherein each of the N absolute-difference sets comprises absolute differences of all the sampling points of the selected basic prediction unit; and
performing one of the following:
acquiring a sum of all absolute differences in each absolute-difference set in the N absolute-difference sets separately to obtain the N prediction errors of the selected basic prediction unit;
acquiring a sum of squares of all the absolute differences in each absolute-difference set in the N absolute-difference sets separately to obtain the N prediction errors of the selected basic prediction unit; or
acquiring high-order norms of all the absolute differences in each absolute-difference set in the N absolute-difference sets separately to obtain the N prediction errors of the selected basic prediction unit.

9. A video decoding apparatus, comprising:
a memory configured to store executable instructions; and
a processor coupled to the memory and configured to:
acquire N pieces of motion information of a target area according to motion-related information in a bitstream generated by an encoder end, wherein N is an integer greater than or equal to 2;
separately perform a motion compensation operation on the target area by using each piece of motion information in the N pieces of motion information to obtain N predictions of the target area, wherein each prediction in the N predictions of the target area comprises predicted values of all sampling points in the target area;
acquire a prediction selection reference of the target area, wherein the prediction selection reference of the target area comprises values of all sampling points in a corresponding reference area of the target area; and
determine a final prediction of the target area according to the N predictions of the target area and the prediction selection reference of the target area, wherein the target area consists of M basic prediction units, wherein M is greater than or equal to 2, wherein determining the final prediction of the target area according to the N predictions of the target area and the prediction selection reference of the target area comprises determining a final prediction of a selected basic prediction unit according to N predictions of the selected basic prediction unit and a prediction selection reference of the selected basic prediction unit, wherein each prediction in the N predictions of the selected basic prediction unit comprises predicted values of all sampling points in the selected basic prediction unit, wherein the prediction selection reference of the selected basic prediction unit comprises values of all sampling points of a basic prediction unit in a reference area of the target area, and wherein the basic prediction unit in the reference area of the target area is located at a same position as a basic prediction unit of the target area.

10. The video decoding apparatus according to claim 9, wherein the processor is further configured to:

calculate N prediction errors of the selected basic prediction unit according to the N predictions of the selected basic prediction unit and the prediction selection reference of the selected basic prediction unit;

compare the N prediction errors of the selected basic prediction unit; and acquire a prediction, corresponding to a minimum prediction error, of the selected basic prediction unit as the final prediction of the selected basic prediction unit.

11. The video decoding apparatus according to claim 9, wherein the processor is further configured to:

determine N weighting factors of the selected basic prediction unit according to the N predictions of the basic prediction unit and the prediction selection reference of the selected basic prediction unit; and perform weighted averaging on the N predictions of the basic prediction unit by using the N weighting factors to obtain the final prediction of the selected basic prediction unit.

12. The video decoding apparatus according to claim 11, wherein the processor is further configured to:

calculate N prediction errors of the selected basic prediction unit according to the N predictions of the selected basic prediction unit and the prediction selection reference of the basic prediction unit; and obtain reciprocals of the N prediction errors of the selected basic prediction unit separately to obtain the N weighting factors of the selected basic prediction unit.

13. The video decoding apparatus according to claim 10, wherein the selected basic prediction unit consists of one or more sampling points.

14. The video decoding apparatus according to claim 10, wherein when the selected basic prediction unit consists of one sampling point, and wherein the processor is further configured to perform one of the following:

obtain absolute differences between values of the sampling point in the N predictions of the selected basic prediction unit and a value of the sampling point in the prediction selection reference of the selected basic prediction unit separately to obtain the N prediction errors of the selected basic prediction unit; and obtain squares of differences between the values of the sampling point in the N predictions of the selected basic prediction unit and the value of the sampling point in the prediction selection reference of the selected basic prediction unit separately to obtain the N prediction errors of the selected basic prediction unit.

15. The video decoding apparatus according to claim 10, wherein when the selected basic prediction unit consists of one sampling point, the processor is further configured to perform one of the following:

obtain differences between values of the sampling point in the N predictions of the selected basic prediction unit and a value of the sampling point in the prediction selection reference of the selected basic prediction unit separately, perform filtering processing on each of the differences, and obtain absolute values, to obtain the N prediction errors of the selected basic prediction unit; or perform the filtering processing on the values of the sampling point in the N predictions of the basic prediction units separately, perform the filtering processing on the value of the sampling point in the prediction selection reference of the selected basic prediction unit, and obtain absolute differences between the values of the sampling point in the N predictions of the basic prediction units separately after the filtering processing and the value of the sampling point in the prediction selection reference of the selected basic prediction unit after the filtering processing, to obtain the N prediction errors of the selected basic prediction unit.

16. The video decoding apparatus according to claim 10, wherein when the selected basic prediction unit consists of multiple sampling points, the processor is further configured to:

obtain absolute differences between values of sampling points at the same positions in the N predictions of the selected basic prediction unit and in the prediction selection reference of the basic prediction units separately to obtain N absolute-difference sets, wherein each of the N absolute-difference sets comprises absolute differences of all the sampling points of the selected basic prediction unit; and perform one of the following:

acquire a sum of all the absolute differences in each absolute-difference set in the N absolute-difference sets to obtain the N prediction errors of the selected basic prediction unit separately;

acquire a sum of squares of all the absolute differences in each absolute-difference set in the N absolute-difference sets to obtain the N prediction errors of the selected basic prediction unit; or acquire high-order norms of all the absolute differences in each absolute-difference set in the N absolute-difference sets to obtain the N prediction errors of the selected basic prediction unit separately.

17. A non-transitory computer readable storage medium, comprising computer program code, which, when executed by a computer processor, causes the computer processor to:

acquire N pieces of motion information of a target area according to motion-related information in a bitstream generated by an encoder end, wherein N is an integer greater than or equal to 2;

perform a motion compensation operation on the target area by using each piece of motion information in the N pieces of motion information separately to obtain N predictions of the target area, wherein each prediction in the N predictions of the target area comprises predicted values of all sampling points in the target area;

acquire a prediction selection reference of the target area, wherein the prediction selection reference of the target area comprises values of all sampling points in a corresponding reference area of the target area; and determine a final prediction of the target area according to the N predictions of the target area and the prediction selection reference of the target area, wherein the target area consists of M basic prediction units, wherein M is greater than or equal to 2, wherein determining the final prediction of the target area according to the N predictions of the target area and the prediction selection reference of the target area comprises determining a final prediction of a selected basic prediction unit according to N predictions of the selected basic prediction unit and a prediction selection reference of the selected basic prediction unit, wherein each prediction in the N predictions of the selected basic prediction unit comprises predicted values of all sampling points in the selected basic prediction unit, wherein the prediction selection reference of the selected basic prediction unit comprises values of all sampling points of a basic prediction unit in a reference area of the target area, and wherein the basic prediction unit in the reference area of the target area is located at a same position as a basic prediction unit of the target area.

* * * * *